(12) United States Patent
Pudiyapura

(10) Patent No.: US 9,143,335 B2
(45) Date of Patent: Sep. 22, 2015

(54) MULTICAST ROUTE CACHE SYSTEM

(75) Inventor: Ajeer Salil Pudiyapura, Sunnyvale, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 174 days.

(21) Appl. No.: 13/621,138

(22) Filed: Sep. 15, 2012

(65) Prior Publication Data

US 2013/0070766 A1    Mar. 21, 2013

Related U.S. Application Data

(60) Provisional application No. 61/535,901, filed on Sep. 16, 2011.

(51) Int. Cl.
| | |
|---|---|
| H04L 12/18 | (2006.01) |
| H04L 12/761 | (2013.01) |
| H04L 12/753 | (2013.01) |
| H04L 12/747 | (2013.01) |

(52) U.S. Cl.
CPC .............. *H04L 12/185* (2013.01); *H04L 45/16* (2013.01); *H04L 45/48* (2013.01); *H04L 45/742* (2013.01)

(58) Field of Classification Search
None
See application file for complete search history.

(56) References Cited

U.S. PATENT DOCUMENTS

| | | |
|---|---|---|
| 5,159,592 A | 10/1992 | Perkins |
| 5,278,986 A | 1/1994 | Jourdenais et al. |
| 5,410,710 A | 4/1995 | Sarangdhar et al. |
| 5,550,816 A | 8/1996 | Hardwick et al. |
| 5,649,110 A | 7/1997 | Ben-Nun et al. |
| 5,701,502 A | 12/1997 | Baker et al. |
| 5,732,209 A | 3/1998 | Vigil et al. |
| 5,828,578 A | 10/1998 | Blomgren |
| 5,878,232 A | 3/1999 | Marimuthu |
| 5,878,264 A | 3/1999 | Ebrahim |
| 5,970,232 A | 10/1999 | Passint et al. |
| 5,978,578 A | 11/1999 | Azarya et al. |
| 6,047,330 A | 4/2000 | Stracke, Jr. |
| 6,097,718 A | 8/2000 | Bion |
| 6,101,188 A | 8/2000 | Sekine et al. |
| 6,104,700 A | 8/2000 | Haddock et al. |

(Continued)

FOREIGN PATENT DOCUMENTS

| | | |
|---|---|---|
| EP | 0887731 A1 | 12/1998 |
| EP | 0926859 A | 6/1999 |

(Continued)

OTHER PUBLICATIONS

U.S. Appl. No. 14/514,253 filed by Zhou et al. on Oct. 14, 2014. (Unpublished. Copy available via USPTO's IFW System).

(Continued)

*Primary Examiner* — Hassan Kizou
*Assistant Examiner* — Roberta A Shand
(74) *Attorney, Agent, or Firm* — Kilpatrick Townsend & Stockton LLP

(57) ABSTRACT

Techniques for organizing and grouping memory contents related to multicast routing so as to enable more efficient multicast operations. For PIM multicast routing, techniques are provided for organizing and grouping multicast routing information into data structures according to a plurality of dimensions such that multicast routing cache entries are accessible when performing a multicast routing operation by traversing the one or more data structures according to at least two of the dimensions.

22 Claims, 8 Drawing Sheets

(56) References Cited

U.S. PATENT DOCUMENTS

| | | | |
|---|---|---|---|
| 6,111,888 | A | 8/2000 | Green et al. |
| 6,115,393 | A | 9/2000 | Engel et al. |
| 6,119,200 | A | 9/2000 | Geeta |
| 6,161,169 | A | 12/2000 | Cheng |
| 6,233,236 | B1 | 5/2001 | Nelson et al. |
| 6,269,391 | B1 | 7/2001 | Gillespie |
| 6,282,678 | B1 | 8/2001 | Snay et al. |
| 6,331,983 | B1 | 12/2001 | Haggerty et al. |
| 6,374,292 | B1 | 4/2002 | Srivastava et al. |
| 6,397,242 | B1 | 5/2002 | Devine et al. |
| 6,424,629 | B1 | 7/2002 | Rubino et al. |
| 6,430,609 | B1 | 8/2002 | Dewhurst et al. |
| 6,442,682 | B1 * | 8/2002 | Pothapragada et al. .......... 713/1 |
| 6,496,510 | B1 | 12/2002 | Tsukakoshi et al. |
| 6,496,847 | B1 | 12/2002 | Bugnion et al. |
| 6,526,054 | B1 * | 2/2003 | Li et al. ................. 370/390 |
| 6,567,417 | B2 | 5/2003 | Kalkunte et al. |
| 6,570,875 | B1 | 5/2003 | Hegde |
| 6,577,634 | B1 | 6/2003 | Tsukakoshi et al. |
| 6,580,727 | B1 | 6/2003 | Yim et al. |
| 6,587,469 | B1 | 7/2003 | Bragg |
| 6,597,699 | B1 | 7/2003 | Ayres |
| 6,604,146 | B1 | 8/2003 | Rempe et al. |
| 6,608,819 | B1 | 8/2003 | Mitchem et al. |
| 6,633,916 | B2 | 10/2003 | Kauffman |
| 6,636,895 | B1 | 10/2003 | Li et al. |
| 6,674,756 | B1 | 1/2004 | Rao et al. |
| 6,675,218 | B1 | 1/2004 | Mahler et al. |
| 6,678,248 | B1 | 1/2004 | Haddock et al. |
| 6,680,904 | B1 | 1/2004 | Kaplan et al. |
| 6,683,850 | B1 | 1/2004 | Dunning et al. |
| 6,691,146 | B1 | 2/2004 | Armstrong et al. |
| 6,704,925 | B1 | 3/2004 | Bugnion |
| 6,711,357 | B1 | 3/2004 | Brewer et al. |
| 6,711,672 | B1 | 3/2004 | Agesen |
| 6,725,289 | B1 | 4/2004 | Waldspurger et al. |
| 6,731,601 | B1 | 5/2004 | Krishna et al. |
| 6,732,220 | B2 | 5/2004 | Babaian et al. |
| 6,763,023 | B1 | 7/2004 | Gleeson et al. |
| 6,785,886 | B1 | 8/2004 | Lim et al. |
| 6,789,156 | B1 | 9/2004 | Waldsprurger |
| 6,791,980 | B1 | 9/2004 | Li |
| 6,795,966 | B1 | 9/2004 | Lim et al. |
| 6,847,638 | B1 | 1/2005 | Wu |
| 6,854,054 | B1 | 2/2005 | Kavanagh |
| 6,859,438 | B2 | 2/2005 | Haddock et al. |
| 6,879,559 | B1 | 4/2005 | Blackmon et al. |
| 6,880,022 | B1 | 4/2005 | Waldsprurger et al. |
| 6,894,970 | B1 | 5/2005 | McDermott, III et al. |
| 6,898,189 | B1 | 5/2005 | Di Benedetto et al. |
| 6,910,148 | B1 | 6/2005 | Ho et al. |
| 6,938,179 | B2 | 8/2005 | Iyer et al. |
| 6,944,699 | B1 | 9/2005 | Bugnion et al. |
| 6,961,806 | B1 | 11/2005 | Agesen et al. |
| 6,961,941 | B1 | 11/2005 | Nelson et al. |
| 6,975,587 | B1 | 12/2005 | Adamski et al. |
| 6,975,639 | B1 | 12/2005 | Hill et al. |
| 7,039,720 | B2 | 5/2006 | Alfieri et al. |
| 7,058,010 | B2 | 6/2006 | Chidambaran et al. |
| 7,061,858 | B1 | 6/2006 | Di Benedetto et al. |
| 7,065,059 | B1 | 6/2006 | Zinin |
| 7,065,079 | B1 | 6/2006 | Patra et al. |
| 7,080,283 | B1 | 7/2006 | Songer et al. |
| 7,093,160 | B2 | 8/2006 | Lau et al. |
| 7,133,399 | B1 | 11/2006 | Brewer et al. |
| 7,188,237 | B2 | 3/2007 | Zhou et al. |
| 7,194,652 | B2 | 3/2007 | Zhou et al. |
| 7,236,453 | B2 | 6/2007 | Visser et al. |
| 7,269,133 | B2 | 9/2007 | Lu et al. |
| 7,284,236 | B2 | 10/2007 | Zhou et al. |
| 7,292,535 | B2 | 11/2007 | Folkes et al. |
| 7,305,492 | B2 | 12/2007 | Bryers et al. |
| 7,308,503 | B2 | 12/2007 | Giraud et al. |
| 7,315,552 | B2 | 1/2008 | Kalkunte et al. |
| 7,317,722 | B2 | 1/2008 | Aquino et al. |
| 7,324,500 | B1 | 1/2008 | Blackmon et al. |
| 7,327,671 | B2 | 2/2008 | Karino et al. |
| 7,339,903 | B2 | 3/2008 | O'Neill |
| 7,360,084 | B1 | 4/2008 | Hardjono |
| 7,362,700 | B2 | 4/2008 | Frick et al. |
| 7,382,736 | B2 | 6/2008 | Mitchem et al. |
| 7,385,977 | B2 | 6/2008 | Wu et al. |
| 7,392,424 | B2 | 6/2008 | Ho et al. |
| 7,404,006 | B1 | 7/2008 | Slaughter et al. |
| 7,406,037 | B2 | 7/2008 | Okita |
| 7,417,947 | B1 | 8/2008 | Marques et al. |
| 7,417,990 | B2 | 8/2008 | Ikeda et al. |
| 7,418,439 | B2 | 8/2008 | Wong |
| 7,424,014 | B2 | 9/2008 | Mattes et al. |
| 7,441,017 | B2 | 10/2008 | Watson et al. |
| 7,444,422 | B1 | 10/2008 | Li |
| 7,447,225 | B2 | 11/2008 | Windisch et al. |
| 7,483,370 | B1 | 1/2009 | Dayal et al. |
| 7,483,433 | B2 | 1/2009 | Simmons et al. |
| 7,503,039 | B2 | 3/2009 | Inoue et al. |
| 7,518,986 | B1 | 4/2009 | Chadalavada et al. |
| 7,522,521 | B2 | 4/2009 | Bettink et al. |
| 7,533,254 | B2 | 5/2009 | Dybsetter et al. |
| 7,535,826 | B1 | 5/2009 | Cole et al. |
| 7,599,284 | B1 | 10/2009 | Di Benedetto et al. |
| 7,609,617 | B2 | 10/2009 | Appanna et al. |
| 7,613,183 | B1 | 11/2009 | Brewer et al. |
| 7,620,953 | B1 | 11/2009 | Tene et al. |
| 7,652,982 | B1 | 1/2010 | Kovummal |
| 7,656,409 | B2 | 2/2010 | Cool et al. |
| 7,664,020 | B2 * | 2/2010 | Luss ........................ 370/230 |
| 7,694,298 | B2 | 4/2010 | Goud et al. |
| 7,720,066 | B2 | 5/2010 | Weyman et al. |
| 7,729,296 | B1 | 6/2010 | Choudhary |
| 7,739,360 | B2 | 6/2010 | Watson et al. |
| 7,751,311 | B2 | 7/2010 | Ramaiah et al. |
| 7,787,360 | B2 | 8/2010 | Windisch et al. |
| 7,787,365 | B1 | 8/2010 | Marques et al. |
| 7,788,381 | B2 | 8/2010 | Watson et al. |
| 7,802,073 | B1 | 9/2010 | Cheng et al. |
| 7,804,769 | B1 | 9/2010 | Tuplur et al. |
| 7,804,770 | B2 | 9/2010 | Ng |
| 7,805,516 | B2 | 9/2010 | Kettler et al. |
| 7,830,802 | B2 | 11/2010 | Huang et al. |
| 7,830,895 | B2 | 11/2010 | Endo et al. |
| 7,843,920 | B2 | 11/2010 | Karino et al. |
| 7,843,930 | B2 | 11/2010 | Mattes et al. |
| 7,873,776 | B2 | 1/2011 | Hetherington et al. |
| 7,886,195 | B2 | 2/2011 | Mayer |
| 7,894,334 | B2 | 2/2011 | Wen et al. |
| 7,929,424 | B2 | 4/2011 | Kochhar et al. |
| 7,940,650 | B1 | 5/2011 | Sandhir et al. |
| 7,944,811 | B2 | 5/2011 | Windisch et al. |
| 7,974,315 | B2 | 7/2011 | Yan et al. |
| 8,009,671 | B2 | 8/2011 | Guo et al. |
| 8,014,394 | B2 | 9/2011 | Ram |
| 8,028,290 | B2 | 9/2011 | Rymarczyk et al. |
| 8,040,884 | B2 | 10/2011 | Arunachalam et al. |
| 8,074,110 | B2 | 12/2011 | Vera et al. |
| 8,086,906 | B2 | 12/2011 | Ritz et al. |
| 8,089,964 | B2 | 1/2012 | Lo et al. |
| 8,095,691 | B2 | 1/2012 | Verdoorn, Jr. et al. |
| 8,099,625 | B1 | 1/2012 | Tseng et al. |
| 8,102,848 | B1 | 1/2012 | Rao |
| 8,121,025 | B2 | 2/2012 | Duan et al. |
| 8,131,833 | B2 | 3/2012 | Hadas et al. |
| 8,149,691 | B1 | 4/2012 | Chadalavada et al. |
| 8,156,230 | B2 | 4/2012 | Bakke et al. |
| 8,161,260 | B2 | 4/2012 | Srinivasan |
| 8,180,923 | B2 | 5/2012 | Smith et al. |
| 8,181,174 | B2 | 5/2012 | Liu |
| 8,291,430 | B2 | 10/2012 | Anand et al. |
| 8,335,219 | B2 | 12/2012 | Simmons et al. |
| 8,341,625 | B2 | 12/2012 | Ferris et al. |
| 8,345,536 | B1 | 1/2013 | Rao et al. |
| 8,406,125 | B2 * | 3/2013 | Dholakia et al. ............. 370/220 |
| 8,495,418 | B2 | 7/2013 | Abraham et al. |
| 8,503,289 | B2 * | 8/2013 | Dholakia et al. ............. 370/218 |
| 8,576,703 | B2 | 11/2013 | Dholakia et al. |

(56) References Cited

U.S. PATENT DOCUMENTS

| | | | |
|---|---|---|---|
| 8,607,110 B1 | 12/2013 | Peng et al. | |
| 8,769,155 B2 | 7/2014 | Nagappan et al. | |
| 8,776,050 B2 | 7/2014 | Plouffe et al. | |
| 2002/0013802 A1 | 1/2002 | Mori et al. | |
| 2002/0035641 A1 | 3/2002 | Kurose et al. | |
| 2002/0103921 A1 | 8/2002 | Nair et al. | |
| 2002/0129166 A1 | 9/2002 | Baxter et al. | |
| 2002/0150094 A1* | 10/2002 | Cheng et al. | 370/389 |
| 2003/0084161 A1 | 5/2003 | Watson et al. | |
| 2003/0105794 A1 | 6/2003 | Jasinschi et al. | |
| 2003/0202520 A1 | 10/2003 | Witkowski et al. | |
| 2004/0001485 A1 | 1/2004 | Frick et al. | |
| 2004/0030766 A1 | 2/2004 | Witkowski | |
| 2004/0078625 A1 | 4/2004 | Rampuria et al. | |
| 2005/0028028 A1 | 2/2005 | Jibbe | |
| 2005/0036485 A1 | 2/2005 | Eilers et al. | |
| 2005/0055598 A1 | 3/2005 | Chen et al. | |
| 2005/0114846 A1 | 5/2005 | Banks et al. | |
| 2005/0149633 A1 | 7/2005 | Natarajan et al. | |
| 2005/0213498 A1 | 9/2005 | Appanna et al. | |
| 2006/0002343 A1 | 1/2006 | Nain et al. | |
| 2006/0004942 A1 | 1/2006 | Hetherington et al. | |
| 2006/0018253 A1 | 1/2006 | Windisch et al. | |
| 2006/0018333 A1 | 1/2006 | Windisch et al. | |
| 2006/0090136 A1 | 4/2006 | Miller et al. | |
| 2006/0143617 A1 | 6/2006 | Knauerhase et al. | |
| 2006/0171404 A1 | 8/2006 | Nalawade et al. | |
| 2006/0176804 A1 | 8/2006 | Shibata | |
| 2006/0184349 A1 | 8/2006 | Goud et al. | |
| 2006/0184938 A1 | 8/2006 | Mangold | |
| 2006/0224826 A1 | 10/2006 | Arai et al. | |
| 2006/0274649 A1 | 12/2006 | Scholl | |
| 2006/0294211 A1 | 12/2006 | Amato | |
| 2007/0027976 A1 | 2/2007 | Sasame et al. | |
| 2007/0036178 A1 | 2/2007 | Hares et al. | |
| 2007/0076594 A1 | 4/2007 | Khan et al. | |
| 2007/0162565 A1 | 7/2007 | Hanselmann | |
| 2007/0169084 A1 | 7/2007 | Frank et al. | |
| 2007/0174309 A1* | 7/2007 | Pettovello | 707/100 |
| 2007/0189213 A1 | 8/2007 | Karino et al. | |
| 2008/0022410 A1 | 1/2008 | Diehl | |
| 2008/0068986 A1 | 3/2008 | Maranhao et al. | |
| 2008/0082810 A1 | 4/2008 | Cepulis et al. | |
| 2008/0120518 A1 | 5/2008 | Ritz et al. | |
| 2008/0159325 A1 | 7/2008 | Chen et al. | |
| 2008/0165681 A1 | 7/2008 | Huang et al. | |
| 2008/0165750 A1 | 7/2008 | Kim | |
| 2008/0189468 A1 | 8/2008 | Schmidt et al. | |
| 2008/0201603 A1 | 8/2008 | Ritz et al. | |
| 2008/0212584 A1* | 9/2008 | Breslau et al. | 370/390 |
| 2008/0222633 A1 | 9/2008 | Kami | |
| 2008/0225859 A1 | 9/2008 | Mitchem | |
| 2008/0243773 A1 | 10/2008 | Patel et al. | |
| 2008/0244222 A1 | 10/2008 | Supalov et al. | |
| 2008/0250266 A1 | 10/2008 | Desai et al. | |
| 2009/0028044 A1 | 1/2009 | Windisch et al. | |
| 2009/0031166 A1 | 1/2009 | Kathail et al. | |
| 2009/0036152 A1 | 2/2009 | Janneteau et al. | |
| 2009/0037585 A1 | 2/2009 | Miloushev et al. | |
| 2009/0049537 A1 | 2/2009 | Chen et al. | |
| 2009/0051492 A1 | 2/2009 | Diaz et al. | |
| 2009/0054045 A1 | 2/2009 | Zakrzewski et al. | |
| 2009/0080428 A1 | 3/2009 | Witkowski et al. | |
| 2009/0086622 A1 | 4/2009 | Ng | |
| 2009/0092135 A1 | 4/2009 | Simmons et al. | |
| 2009/0094481 A1 | 4/2009 | Vera et al. | |
| 2009/0106409 A1 | 4/2009 | Murata | |
| 2009/0185506 A1 | 7/2009 | Watson et al. | |
| 2009/0198766 A1 | 8/2009 | Chen et al. | |
| 2009/0216863 A1 | 8/2009 | Gebhart et al. | |
| 2009/0219807 A1 | 9/2009 | Wang | |
| 2009/0245248 A1 | 10/2009 | Arberg et al. | |
| 2009/0316573 A1 | 12/2009 | Lai | |
| 2010/0017643 A1 | 1/2010 | Baba et al. | |
| 2010/0039932 A1 | 2/2010 | Wen et al. | |
| 2010/0058342 A1 | 3/2010 | Machida | |
| 2010/0064293 A1 | 3/2010 | Kang et al. | |
| 2010/0107162 A1 | 4/2010 | Edwards et al. | |
| 2010/0138208 A1 | 6/2010 | Hattori et al. | |
| 2010/0138830 A1 | 6/2010 | Astete et al. | |
| 2010/0169253 A1 | 7/2010 | Tan | |
| 2010/0235662 A1 | 9/2010 | Nishtala | |
| 2010/0257269 A1 | 10/2010 | Clark | |
| 2010/0278091 A1 | 11/2010 | Sung et al. | |
| 2010/0287548 A1 | 11/2010 | Zhou et al. | |
| 2010/0325381 A1 | 12/2010 | Heim | |
| 2010/0325485 A1 | 12/2010 | Kamath et al. | |
| 2011/0010709 A1 | 1/2011 | Anand et al. | |
| 2011/0023028 A1 | 1/2011 | Nandagopal et al. | |
| 2011/0072327 A1 | 3/2011 | Schoppmeier et al. | |
| 2011/0125949 A1 | 5/2011 | Mudigonda et al. | |
| 2011/0126196 A1 | 5/2011 | Cheung et al. | |
| 2011/0154331 A1 | 6/2011 | Ciano et al. | |
| 2011/0173334 A1 | 7/2011 | Shah | |
| 2011/0228770 A1 | 9/2011 | Dholakia et al. | |
| 2011/0228771 A1 | 9/2011 | Dholakia et al. | |
| 2011/0228772 A1 | 9/2011 | Dholakia et al. | |
| 2011/0228773 A1 | 9/2011 | Dholakia et al. | |
| 2011/0231578 A1 | 9/2011 | Nagappan et al. | |
| 2012/0023309 A1 | 1/2012 | Abraham et al. | |
| 2012/0023319 A1 | 1/2012 | Chin et al. | |
| 2012/0030237 A1 | 2/2012 | Tanaka | |
| 2012/0158995 A1 | 6/2012 | McNamee et al. | |
| 2012/0174097 A1 | 7/2012 | Levin | |
| 2012/0230240 A1 | 9/2012 | Nebat et al. | |
| 2012/0290869 A1 | 11/2012 | Heitz | |
| 2013/0070766 A1 | 3/2013 | Pudiyapura | |
| 2013/0211552 A1 | 8/2013 | Gomez et al. | |
| 2013/0259039 A1 | 10/2013 | Dholakia et al. | |
| 2014/0007097 A1 | 1/2014 | Chin et al. | |
| 2014/0029613 A1 | 1/2014 | Dholakia et al. | |
| 2014/0036915 A1 | 2/2014 | Dholakia et al. | |
| 2014/0068103 A1 | 3/2014 | Gyambavantha et al. | |
| 2014/0089425 A1 | 3/2014 | Chin et al. | |
| 2014/0089484 A1 | 3/2014 | Chin et al. | |
| 2014/0095927 A1 | 4/2014 | Abraham et al. | |

FOREIGN PATENT DOCUMENTS

| | | |
|---|---|---|
| EP | 1107511 A2 | 6/2001 |
| EP | 1 939 742 A2 | 2/2008 |
| EP | 2 084 605 A2 | 8/2009 |
| WO | 2008/054997 A2 | 5/2008 |
| WO | 2014/004312 A1 | 1/2014 |

OTHER PUBLICATIONS

"GIGAswitch FDDI System—Manager's Guide," Part No. EK-GGMGA-MG.B01, Jun. 1993 first printing, Apr. 1995 second printing, Copyright 1995, 113 pages, Digital Equipment Corporation, Maynard, MA.

"GIGAswitch System—Manager's Guide," Part No. EK-GGMGA-MG.A01, Jun. 1993, Copyright 1993, 237 pages, Digital Equipment Corporation, Maynard, MA.

"Brocade Serverlron ADX 1000, 4000, and 8000 Series Frequently Asked Questions," 10 pages, Copyright 2009, Brocade Communications Systems, Inc., April.

Braden et al., "Integrated Services in the Internet Architecture: an Overview," Jul. 1994, RFC 1633, Network Working Group, pp. 1-28.

Burke, "Vmware Counters Oracle, Microsoft With Free Update", Nov. 13, 2007, 2 pages.

Chen, "New Paradigm In Application Delivery Networking: Advanced Core Operating System (ACOS) and Multi-CPU Architecture—They Key to Achieving Availability, Scalability and Preformance." White Paper, May 2009, 5 pages, A10 Networks.

Cisco IP Routing Handbook, Copyright 2000, 24 pages, M&T Books.

Cisco Systems, Inc., "BGP Support for Nonstop Routing (NSR) with Stateful Switchover (SSO)." Mar. 20, 2006, 18 pages.

Cisco Systems, Inc., "Graceful Restart, Non Stop Routing and IGP routing protocol timer Manipulation," Copyright 2008, 4 pages, June.

(56) References Cited

OTHER PUBLICATIONS

Cisco Systems, Inc., "Intermediate System-to-Intermediate System (IS-IS) Support for Graceful Restart (GR) and Non-Stop Routing (NSR)," Copyright 2008, pp. 1-3, June.
Cisco Systems, Inc., "Internet Protocol Multicast," Internetworking Technologies Handbook, 3rd Edition, Published 2000, Chapter 43, 16 pages.
Cisco Systems, Inc., "Multicast Quick—Start Configuration Guide," Document ID:9356, Copyright 2008-2009, 15 pages.
Cisco Systems, Inc., "Warm Reload," CISCO IOS Releases 12.3(2)T, 12.2(18)S, and 12.2(27)SBC, Copyright 2003, 14 pages.
Demers et al., "Analysis and Simulation of a Fair Queueing Algorithm," Xerox PARC, Copyright 1989, 12 pages, ACM.
European Search Report for Application No. EP 02254403, dated Mar. 18, 2003, 3 pages.
European Search Report for Application No. EP 02256444, dated Feb. 23, 2005, 3 pages.
*Extreme v. Enterasys* WI Legal Transcript of Stephen R. Haddock, May 7, 2008, vol. 2, 2 pages.
Fenner, et al., "Protocol Independent Multicast—Sparse Mode (PIM-SM): Protocol Specification (Revised)." Network Working Group, RFC 4601, Aug. 2006, pp. 1-151.
Floyd et al., "Link-sharing and Resource Management Models for Packet Networks," IEEE/ACM Transactions on Networking, Aug. 1995, vol. 3, No. 4, Copyright 1995, IEEE, 22 pages.
Freescale Semiconductor, Inc., "Freescale's Embedded Hypervisor for QorIQ™ P4 Series Communications Platform," White Paper, Oct. 2008, Copyright 2008, 8 pages, Document No. EMHYPQIQTP4CPWP, Rev. 1.
Freescale Semiconductor, Inc., "Embedded Multicore: An Introduction," Jul. 2009, Copyright 2009, 73 pages, Document No. EMBMCRM, Rev. 0.
Hardwick, "IP Multicast Explained," Metaswitch Networks, Jun. 2004, 71 pages.
Hemminger, "Delivering Advanced Application Acceleration & Security," Application Delivery Challenge, Jul. 2007, 3 pages.
Intel® Virtualization Technology, Product Brief, "Virtualization 2.0—Moving Beyond Consolidation", 2008, 4 pages.
IP Infusion Brochure, "ZebOS® Network Platform: Transporting You to Next Generation Networks," ip infusion™ An ACCESS Company, Jun. 2008, 6 pages.
Kaashok et al., "An Efficient Reliable Broadcast Protocol," Operating System Review, Oct. 4, 1989, 15 pages.
Kakadia, et al., "Enterprise Network Design Patterns: High Availability" Sun Microsystems, Inc., Sun BluePrints™ Online, Revision A, Nov. 26, 2003, 37 pages, at URL: http://www.sun.com/blueprints.
Kaplan, "Part 3 in the Reliability Series: NSR™ Non-Stop Routing Technology," White Paper, Avici Systems, Copyright 2002, 8 pages.
Keshav, "An Engineering Approach to Computer Networking: ATM Networks; the internet, and the Telephone Network," Addison-Wesley Professional Computing Series, part 1 of 5, May 15, 1997, Copyright 1997, 148 pages, by AT&T, Addison-Wesley Publishing Company.
Keshav, "An Engineering Approach to Computer Networking: ATM Networks; the internet, and the Telephone Network," Addison-Wesley Professional Computing Series, part 2 of 5, May 15, 1997, Copyright 1997, 131 pages, by AT&T, Addison-Wesley Publishing Company.
Keshav, "An Engineering Approach to Computer Networking: ATM Networks; the internet, and the Telephone Network," Addison-Wesley Professional Computing Series, part 3 of 5, May 15, 1997, Copyright 1997, 129 pages, by AT&T, Addison-Wesley Publishing Company.
Keshav, "An Engineering Approach to Computer Networking: ATM Networks; the internet, and the Telephone Network," Addison-Wesley Professional Computing Series, part 4 of 5, May 15, 1997, Copyright 1997, 130 pages, by AT&T, Addison-Wesley Publishing Company.
Keshav, "An Engineering Approach to Computer Networking: ATM Networks; the internet, and the Telephone Network," Addison-Wesley Professional Computing Series, part 5 of 5, May 15, 1997, Copyright 1997, 142 pages, by AT&T, Addison-Wesley Publishing Company.
Khan, "IP Routing Use Cases," Cisco Press, Sep. 22, 2009, pp. 1-16, at URL: http://www.ciscopress.com/articles/printerfriendly.asp?p=1395746.
Lee, et al., "Open Shortest Path First (OSPF) Conformance and Performance Testing," White Papers, Ixia—Leader in Convergence IP Testing, Copyright 1998-2004, pp. 1-17.
Manolov, et al., "An Investigation into Multicasting, Proceedings of the 14th Annual Workshop on Architecture and System Design," (ProRISC2003), Veldhoven, The Netherlands, Nov. 2003, 6 pages.
May, et al., "An Experimental Implementation of Traffic Control for IP Networks," 1993, 11 pages, Sophia-Antipolis Cedex, France.
Moy, "OSPF Version 2," Network Working Group, RFC 2328, Apr. 1998, 204 pages.
Order Granting/Denying Request for Ex Parte Reexamination for U.S. Appl. No. 90/010,432, mailed on May 21, 2009, 18 pages.
Order Granting/Denying Request for Ex Parte Reexamination for U.S. Appl. No. 90/010,433, mailed on May 22, 2009, 15 pages.
Order Granting/Denying Request for Ex Parte Reexamination for U.S. Appl. No. 90/010,434, mailed on May 22, 2009, 20 pages.
Pangal, "Core Based Virtualization—Secure, Elastic and Deterministic Computing is Here . . . ," Blog Posting, May 26, 2009, 1 page, printed on Jul. 13, 2009, at URL: http://community.brocade.com/home/community/brocadeblogs/wingspan/blog/tags/serveri . . . .
Partridge, "A Proposed Flow Specification," RFC 1363, Sep. 1992, pp. 1-20, Network Working Group.
Pepelnjak, et al., "Using Multicast Domains," informIT, Jun. 27, 2003, pp. 1-29, at URL: http://www.informit.com/articles/printerfriendly.aspx?p=32100.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, 11 pages.
Quickspecs, "HP Online VM Migration (for HP Integrity Virtual Machines)", Wordwide—Version 4, Sep. 27, 2010, 4 pages.
Riggsbee, "From ADC to Web Security, Serving the Online Community," Blog Posting, Jul. 8, 2009, 2 pages, printed on Dec. 22, 2009, at URL: http://community.brocade.com/home/community/brocadeblogs/wingspan/blog/2009/07/0 . . . .
Riggsbee, "You've Been Warned, the Revolution Will Not Be Televised," Blog Posting, Jul. 9, 2009, 2 pages, printed on Dec. 22, 2009, at URL: http://community.brocade.com/home/community/brocadeblogs/wingspan/blog/2009/07/0 . . . .
Rodbell, "Protocol Independent Multicast—Sparse Mode," CommsDesign, Dec. 19, 2009, pp. 1-5, at URL: http://www.commsdesign.com/main/9811/9811standards.htm.
Schlansker, et al., "High-Performance Ethernet-Based Communications for Future Multi-Core Processors," SC07 Nov. 10-16, 2007, Copyright 2007, 12 pages, ACM.
TCP/IP Illustrated, vol. 2: The Implementation, Gray R. Wright and W. Richard Stevens, Addison-Wesley 1995, 23 pages.
VMware, "Dynamic Balancing And Allocation Of Resources For Virtual Machines", Product Datasheet, Copyright® 1998-2006, 2 pages.
VMware, "Live Migration For Virtual Machines Without Service Interruption", Product Datasheet, Copyright® 2009 Vmware, Inc., 4 pages.
VMware, "Resource Management with Vmware DRS", VMware Infrastructure, Copyright® 1998-2006, 24 pages.
VMware., "Automating High Availability (HA) Services With VMware HA", VMware Infrastructure, Copyright® 1998-2006, 15 pages.
Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, 6 pages.
Notification Of Transmittal Of The International Search Report And The Written Opinion Of The International Searching Authority, Or The Declaration; International Search Report and Written Opinion

(56) References Cited

OTHER PUBLICATIONS

Of The International Searching Authority for International Application No. PCT/US2013/047105 mailed on Oct. 29, 2013, 8 pages.
Non-Final Office Action for U.S. Appl. No. 09/953,714, mailed on Dec. 21, 2004, 16 pages.
Final Office Action for U.S. Appl. No. 09/953,714, mailed on Jun. 28, 2005, 17 pages.
Non-Final Office Action for U.S. Appl. No. 09/896,228, mailed on Jul. 29, 2005, 17 pages.
Non-Final Office Action for U.S. Appl. No. 09/953,714, mailed on Jan. 26, 2006, 15 pages.
Final Office Action for U.S. Appl. No. 09/953,714, mailed on Aug. 17, 2006, 17 pages.
Non-Final Office Action for U.S. Appl. No. 09/896,228, mailed on Mar. 5, 2007, 14 pages.
Final Office Action for U.S. Appl. No. 09/896,228, mailed on Aug. 21, 2007, 15 pages.
Non-Final Office Action for U.S. Appl. No. 09/896,228, mailed on Sep. 7, 2006, 17 pages.
Notice of Allowance for U.S. Appl. No. 09/896,228, mailed on Jun. 17, 2008, 20 pages.
Non-Final Office Action for U.S. Appl. No. 12/210,957, mailed on Sep. 2, 2009, 16 pages.
Notice of Allowance for U.S. Appl. No. 09/953,714, mailed on Sep. 14, 2009, 6 pages.
Notice of Allowance for U.S. Appl. No. 12/210,957, mailed on Feb. 4, 2010, 10 pages.
Non-Final Office Action for U.S. Appl. No. 12/333,029, mailed on May 27, 2010, 29 pages.
Non-Final Office Action for U.S. Appl. No. 12/333,029, mailed on Mar. 30, 2012, 14 pages.
Non-Final Office Action for U.S. Appl. No. 12/626,432 mailed on Jul. 12, 2012, 13 pages.
Non-Final Office Action for U.S. Appl. No. 12/913,572 mailed on Aug. 3, 2012, 6 pages.
Non-Final Office Action for U.S. Appl. No. 12/823,073 mailed on Aug. 6, 2012, 21 pages.
Notice of Allowance for U.S. Appl. No. 12/333,029 mailed on Aug. 17, 2012, 5 pages.
Non-Final Office Action for U.S. Appl. No. 12/913,598 mailed on Sep. 6, 2012, 10 pages.
Non-Final Office Action for U.S. Appl. No. 12/913,612 mailed on Sep. 19, 2012, 11 pages.
Non-Final Office Action for U.S. Appl. No. 12/913,650 mailed on Oct. 2, 2012, 9 pages.
Notice of Allowance for U.S. Appl. No. 12/913,572 mailed on Nov. 21, 2012, 7 pages.
Non-Final Office Action for U.S. Appl. No. 12/842,936 mailed on Nov. 28, 2012, 12 pages.
Final Office Action for U.S. Appl. No. 12/823,073 mailed on Jan. 23, 2013, 23 pages.
Notice of Allowance for U.S. Appl. No. 12/913,598 mailed on Mar. 12, 2013, 5 pages.
Notice of Allowance for U.S. Appl. No. 12/913,650 mailed on Mar. 25, 2013, 6 pages.
Notice of Allowance for U.S. Appl. No. 12/842,936 mailed on Apr. 8, 2013, 6 pages.
Final Office Action for U.S. Appl. No. 12/626,432 mailed on Apr. 12, 2013, 14 pages.
Non-Final Office Action for U.S. Appl. No. 12/842,945 mailed on Jun. 20, 2013, 14 pages.
Notice of Allowance for U.S. Appl. No. 12/913,598 mailed on Jul. 9, 2013, 6 pages.
Advisory Action for U.S. Appl. No. 12/626,432 mailed on Sep. 25, 2013, 4 pages.
Non-Final Office Action for U.S. Appl. No. 12/626,432 mailed on Nov. 21, 2013, 9 pages.
Notice of Allowance for U.S. Appl. No. 12/823,073 mailed on Feb. 19, 2014, 8 pages.
Final Office Action for U.S. Appl. No. 12/842,945 mailed on Mar. 7, 2014, 13 pages.
Final Office Action for U.S. Appl. No. 12/626,432 mailed on Jul. 3, 2014, 12 pages.
Non-Final Office Action for U.S. Appl. No. 13/925,696 mailed on Aug. 27, 2014, 8 pages.
Non-Final Office Action for U.S. Appl. No. 13/796,136 mailed on Sep. 8, 2014, 19 pages.
Non-Final Office Action for U.S. Appl. No. 12/842,945 mailed on Sep. 17, 2014, 7 pages.
Notice of Allowance for U.S. Appl. No. 13/925,696 mailed on Jan. 7, 2015, 6 pages.
Non-Final Office Action for U.S. Appl. No. 12/626,432 mailed on Jan. 15, 2015, 13 pages.
Non-Final Office Action for U.S. Appl. No. 13/827,641 mailed on Feb. 18, 2015, 7 pages.
Non-Final Office Action for U.S. Appl. No. 13/770,751 mailed on Feb. 24, 2015, 10 pages.
Notice of Allowance for U.S. Appl. No. 13/925,723 mailed on Mar. 17, 2015, 5 pages.
Non-Final Office Action for U.S. Appl. No. 13/840,540 mailed on Mar. 23, 2015, 14 pages.
Final Office Action for U.S. Appl. No. 13/796,136 mailed on Mar. 27, 2015, 17 pages.
Non-Final Office Action for U.S. Appl. No. 14/050,263, mailed on Apr. 23, 2015, 5 pages.
Notice of Allowance for U.S. Appl. No. 12/842,945, mailed on Apr. 8, 2015, 9 pages.

* cited by examiner

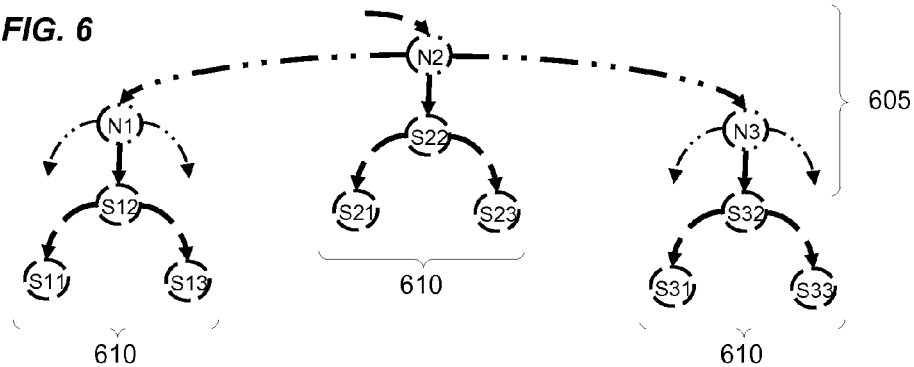
FIG. 6
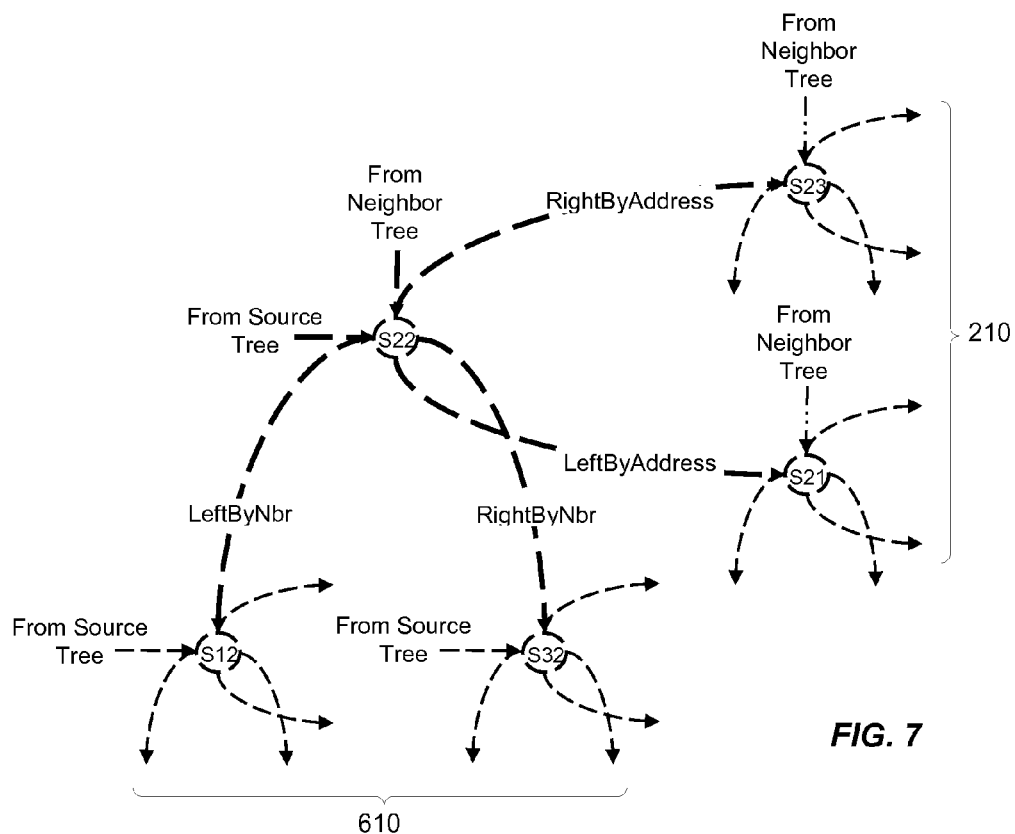
FIG. 7
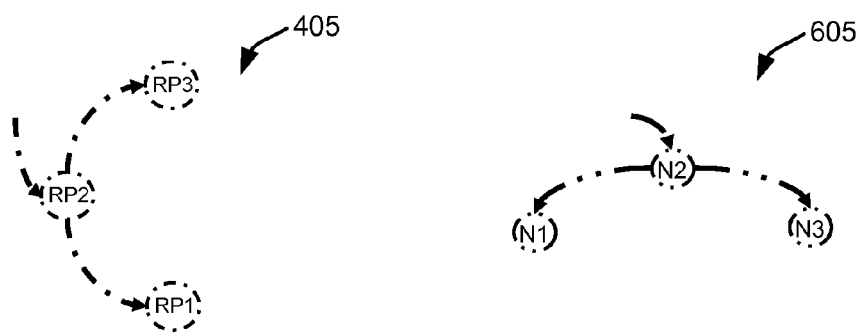
FIG. 8
FIG. 9

MULTICAST ROUTE CACHE SYSTEM

CROSS-REFERENCES TO RELATED APPLICATIONS

The present application is a non-provisional of and claims the benefit and priority under 35 U.S.C. 119(e) of U.S. Provisional Application No. 61/535,901, filed Sep. 16, 2011, entitled MULTICAST ROUTE CACHE SYSTEM, the entire contents of which are incorporated herein by reference for all purposes.

BACKGROUND

The present disclosure relates to networking technologies, and more particularly to techniques for performing efficient multicast operations.

Multicast routing protocols are used to distribute data to multiple recipients. IP multicasting enables a sender device (or sender host) to send a packet to a set of recipients. The set of recipients is referred to as a multicast group and is represented by an IP address referred to as the multicast address. A multicast address thus corresponds to or represents a group of IP hosts that have joined the multicast group and want to receive packets whose destination address is the multicast address. By specifying a multicast address as the destination address for a packet (referred to as a multicast packet or multicast IP datagram), the packet is then delivered to the zero or more members (receivers) of the multicast group.

The membership of a multicast group is dynamic—hosts may join and leave multicast groups at any time. There is typically no restriction on the location or number of members in a multicast group. An IP host may be a member of more than one multicast group at a time. A host need not be a member of a group to be able to send multicast packets. Internet Group Management Protocol (IGMP) is an example of a protocol that facilitates formation and management of multicast groups. Hosts may use IGMP to join or leave multicast groups. Hosts may also use IGMP to advertise their membership in a multicast group.

Forwarding of multicast packets from senders to receivers is performed by a fabric of network devices (e.g., routers, switches) that execute a multicast routing protocol. For example, multicast routing may be performed using Protocol Independent Multicast (PIM), which is a collection of multicast routing protocols including protocols such as PIM Sparse-Mode, PIM dense Mode, Bi-directional PIM, and others. PIM and its variants provide a set of protocols that can be used by network devices such as routers providing multicast routing services to distribute information about multicast group membership.

Network devices such as routers that are configured to perform multicast routing are also referred to as multicast routers. A multicast router typically maintains multicast state information (also referred to as multicast information) that is used by the router to forward a multicast packet to its multicast group receivers. The multicast information can include PIM mcache information (also referred to as a multicast routing table) with multiple forwarding entries (referred to as mcache entries) that are cached by the router and are used to determine how a multicast packet is to be forwarded by the router.

For some networks, there may be tens of thousands of mcache entries. PIM mcache information is conventionally structured with hash tables and linked lists, such that all mcache entries that hash to the same hash bucket is further organized as a linked list. Because of this structure, with conventional multicast routing techniques, when an event occurs (e.g., a link goes down), all of the mcache entries need to be traversed to determine which particular mcache entries are affected by the event. This need to traverse all mcache entries can lead to significant inefficiency if the number of mcache entries affected is very small relative to the number of entries.

BRIEF SUMMARY

Certain embodiments of the present invention provide techniques for organizing and grouping memory contents related to multicast routing so as to enable more efficient multicast operations and scaling. In one embodiment, for PIM multicast routing, techniques are provided for grouping mcache entries according to multiple dimensions to enable heursitic searches during multicast operations.

In one embodiment, a network device comprises a memory and a processor. The memory is adapted to store multicast routing information including information about multicast routing cache entries. The processor is adapted to generate a set of data structures based upon the multicast routing information. The data structures enable the multicast routing information to be organized along multiple dimensions or views. The processor is further adapted to perform a multicast routing operation relating to one or more multicast routing cache entries. Performing the operation includes traversing one or more data structures in the set of data structures. One or more multicast routing cache entries may be identified by traversing the one or more data structures according to at least two of the multiple dimensions.

In certain embodiments, a data structure may represent a node of a tree structure that is based upon the multicast routing information. In certain embodiments, a data structure may represent one of a multicast routing cache entry, a multicast source, a multicast group, a rendezvous point (RP), and a reverse path forwarding (RPF) neighbor. The multiple dimensions along which the multicast routing information may be organized may include one or more of the multicast source, the multicast group, the RP, and the RPF neighbor.

The multicast routing operation performed may be of different types. For example, it may be a search for one or more multicast routing cache entries, a traversal of all multicast routing cache entries, or processing of a multicast route change. In certain embodiments, the multicast routing operation performed is the processing of an RP down event or an RP up event; in other embodiments, the multicast routing operation performed is the processing of an RPF neighbor down event or an RPF neighbor up event. In still other embodiments, the multicast routing operation is sending or processing of a Join/Prune message.

In performing the operation, the data structures may be traversed according to ascending order of addresses of one of the multicast source, the multicast group, the RP, and the RPF neighbor. In other embodiments, performing the operation may involve traversing the data structures to perform a heuristic binary search for one or more of a multicast routing cache entry, a multicast source, a multicast group, an RP, and an RPF neighbor.

The foregoing, together with other features and embodiments will become more apparent upon referring to the following specification, claims, and accompanying drawings

BRIEF DESCRIPTION OF THE DRAWINGS

FIG. 6 depicts an example of an AVL tree of RPF neighbors toward sources in the mcache, by their address, according to an embodiment of the present invention;

FIG. 7 depicts an example of a source node being part of two AVL trees according to an embodiment of the present invention;

FIG. 8 depicts an example of RP nodes being part of one AVL tree based on their addresses according to an embodiment of the present invention;

FIG. 9 depicts an example of RPF neighbor nodes being part of one AVL tree based on their addresses according to an embodiment of the present invention;

DETAILED DESCRIPTION

Figure 1:
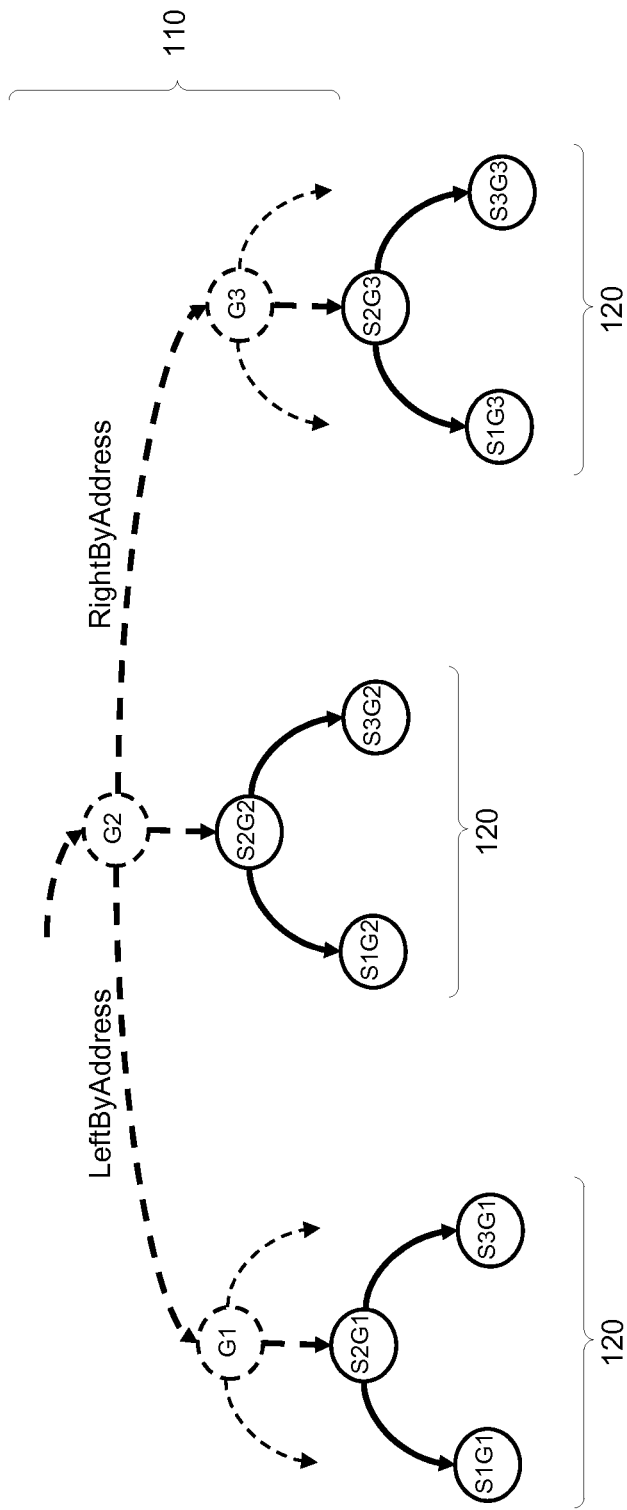
FIG. 1 depicts an example of data structures for organizing multicast mcache entries and groups based on their addresses according to an embodiment of the present invention.

Attached as Appendix A are example data structures for memory cache used for multicast routing that may be implemented in accordance with an embodiment of the present invention.

Attached as Appendix B are example application programming interfaces (APIs) for memory cache used for multicast routing that may be implemented in accordance with an embodiment of the present invention.

It should be understood that the specific embodiments described in Appendices A and B are not limiting examples of the invention and that some aspects of the invention might use the teachings of Appendices A and B while others might not. It should also be understood that limiting statements in Appendices A and B may be limiting as to requirements of specific embodiments and such limiting statements might or might not pertain to the claimed inventions and, therefore, the claim language need not be limited by such limiting statements.

In the following description, for the purposes of explanation, specific details are set forth in order to provide a thorough understanding of certain embodiments of the invention. However, it will be apparent that various embodiments may be practiced without these specific details. The figures and description are not intended to be restrictive.

Certain embodiments of the present invention provide techniques for organizing and grouping memory contents related to multicast routing so as to enable more efficient multicast operations and scaling. In particular, this description provides an architecture, an organization, data structure layouts, algorithms, and APIs for memory cache used for multicast routing (also referred to as Multicast Route Cache, mcache, or cache) that enables various multicast routing protocol operations to be optimized even when a large number of route entries (e.g., 64,000 and beyond) are present in the cache. The optimizations enable access, either directly or through heuristic binary searches, to mcache entries that are affected by the multicast routing protocol operations. Although embodiments are described with reference to PIM, the systems and techniques discussed are not limited to PIM and may also apply to other multicast routing protocols, for example, Distance Vector Multicast Routing Protocol (DVMRP) and IGMP. Generally, the concept is applicable to a data set with entries that can be organized by multiple dimensions or views, such that each dimension or view represents the entries (i.e., a subset of the entries in the entire data set) that will be affected by a common event, and each entry may belong to more than one dimension or view.

A multicast router typically maintains multicast information that is used by the router to forward a multicast packet to its multicast group receivers. The multicast information may be generated by a multicast routing protocol such as PIM that is executed by a processor, such as a management processor, of the router. Multicast packets are forwarded in a network using a multicast distribution tree. A multicast packet is replicated at each fork in the distribution tree such that only one copy of the packet is transmitted through any particular link even if that link leads to multiple receivers. A multicast protocol such as PIM may be used to set up multicast distribution trees such that data packets from senders to a multicast group reach all receivers who have joined the group.

There are generally two types of multicast distribution trees: a source multicast distribution tree and a shared multicast distribution tree. A source multicast distribution tree is rooted at the sender (i.e., the source of a multicast packet) and the receivers are located at the ends of the branches of the tree. The branches of a source multicast distribution tree form a Shortest Path Tree through the network from the sender to the one or more receivers. A separate source multicast distribution tree is built for each sender host sending data to a multicast group. An (S, G) notation is used to represent forwarding entries based upon a source distribution tree, with each active source having an (S, G) entry, where S represents the IP address of the source and G represents the multicast group address to which the packet is to be sent.

Shared multicast distribution trees use a single common root placed at some chosen node in the network. In PIM, the common root is referred to as the Rendezvous Point (RP). The RP is the point at which receivers join to learn of active sources. Multicast traffic sent from a source to a group is carried by the network to the RP for that group. When receivers join a multicast group on a shared tree, the root of the tree is always the RP, and multicast traffic is transmitted from the RP down toward the receivers. Therefore, the RP acts as a go-between for the sources and receivers. Multicast forwarding entries for a shared tree use the notation (*, G), with the * representing that all sources for a particular group share the same tree and G representing the multicast group address.

The multicast information can include PIM mcache information with mcache entries that are cached by the network device and are used to determine how a multicast packet is to be forwarded by the network device. The mcache entries include (S, G) or (*, G) entries, with each entry identifying incoming interface (e.g., input port) information and associated one or more outgoing interfaces (e.g., output ports) information. The incoming interface information associated with a mcache entry identifies an interface of the network device over which a multicast packet is received. The outgoing interface information associated with the mcache entry identifies, for the multicast packet received via the incoming interface identified by the entry, one or more interfaces of the network device to be used for forwarding the multicast packet from the network device.

Multiple protocol and system/command line interface (CLI) events may cause mcache entries to be created, updated, deleted, or searched. Identified and described below are various ways in which information and entries stored in the mcache may be organized or grouped so as to enable efficient PIM operations. The reasons for the organization are provided. Also described are several methods of traversing the mcache, which may be needed or triggered by the various protocol and CLI events. Examples of mcache traversals include the following:

(1) All entries in the mcache are traversed in ascending order of group address, sorted by ascending order of source addresses within each group. This may be used for displaying the mcache in response to a command such as "Show ip pim mcache" from the CLI.

(2) All distinct groups in the mcache are traversed. This may be used for efficiently assembling a Join/Prune message, which includes a list of groups and a list of joined and pruned sources for each group.

(3) All sources in the mcache of a given group are traversed. This also may be used for efficiently assembling a Join/Prune message.

(4) All groups in the mcache that hash to the same RP are traversed. This may be used when an RP goes down and all the groups that used to map to that RP needs to be rehashed into one or more different RPs.

(5) All entries in the mcache that have the same Reverse Path Forwarding (RPF) neighbor are traversed. This may be used for efficiently processing RPF neighbor events.

(6) All entries in the mcache with the same source are traversed. This may be used for efficiently processing route change events toward sources.

(7) Entries in the mcache are traversed to search for a specific (S, G) entry or (*, G) entries. This may be used for efficiently processing incoming join/prune messages, state machine, etc.

Described below are various ways in which information and entries stored in the mcache may be organized or grouped so as to enable efficient PIM operations. Techniques and example data structures are provided for grouping mcache entries according to multiple dimensions to enable efficient and heursitic searches and traversals during multicast operations. In one embodiment, these data structures are maintained in network devices (e.g., routers).

FIG. 1 depicts an example of data structures for organizing multicast mcache entries and groups based on their addresses according to an embodiment of the present invention. In the embodiment depicted in FIG. 1, the data structures are AVL trees. As known in the art, an AVL tree is a self-balancing binary search tree. The use of AVL trees is not intended to be limiting. Other data structures may be used in alternative embodiments.

FIG. 1 depicts two types of AVL trees, namely a Group Tree 110 depicted using short dash lines and multiple Group (S, G) Trees 120 depicted using solid lines. A Group Tree 110 may include one or more nodes, with each node representing a unique group (G) from the mcache. The root of a Group Tree may be referred to as a Group Tree global root. For example, in FIG. 1, the node representing group G2 is a local root for the portion of the Group Tree 110 depicted in FIG. 1. The nodes in a Group Tree may be organized according to an AVL tree based upon the group address values. A node in a Group Tree can point to up to two child group nodes. In one embodiment, a Group Tree node (e.g., G2) has two pointers (or references or branches) with a left pointer that can point to another node (e.g., G1) in the Group Tree representing a group address that is less than the address represented by the group node (e.g., G2), and a right pointer that can point to another node (e.g., G3) in the Group Tree representing a group address that is greater than the address represented by the group node (e.g., G2).

In addition to the left and right pointers, a node representing a particular group in the Group Tree also points to a root of a tree of nodes representing mcache entries with that same particular group. The tree of nodes representing mcache entries with that same particular group may be referred to as a Group (S, G) Tree. Each node of a Group (S, G) Tree represents a mcache entry. For example, in FIG. 1, the root node of Group Tree 110 representing group G2 points to the root node S2G2 of the Group (S, G) Tree 120 comprising (S, G) nodes representing mcache entries S2G2, S1G2, and S3G2. Each Group (S, G) Tree 120 may be an AVL tree with nodes organized based upon the addresses of the respective source (S).

Figure 2:
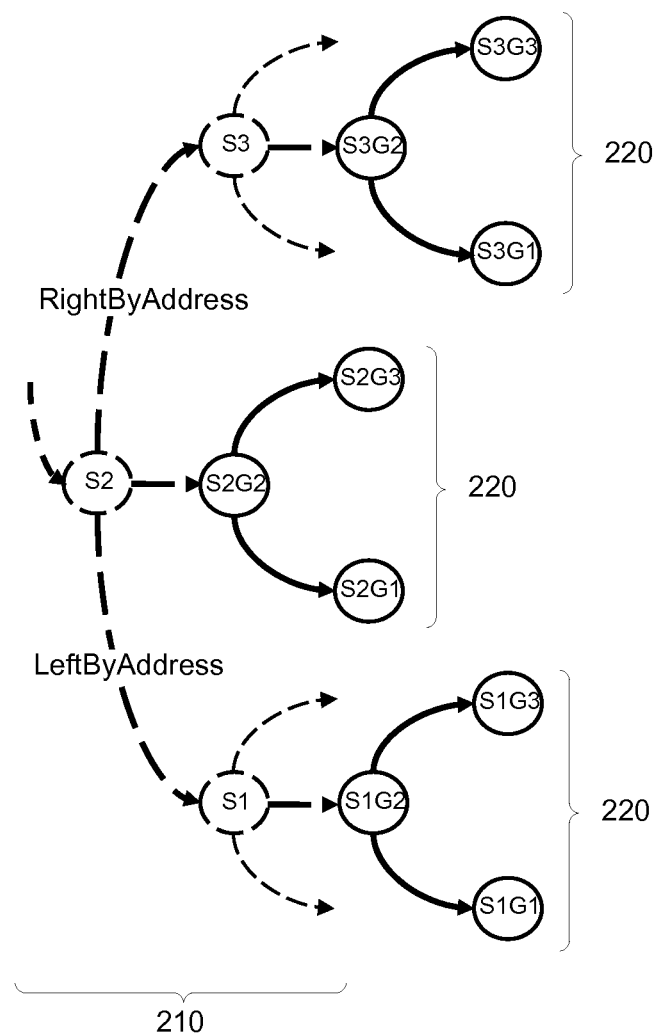
FIG. 2 depicts an example of data structures for organizing multicast mcache entries and sources based on their addresses according to an embodiment of the present invention.

FIG. 2 depicts an example of data structures for organizing multicast mcache entries and sources based on their addresses according to an embodiment of the present invention. In the embodiment depicted in FIG. 2, the data structures are AVL trees, although other data structures may be used in alternative embodiments.

FIG. 2 depicts two types of AVL trees, namely a Source Tree 210 depicted using long dash lines and multiple Source (S, G) Trees 220 depicted using solid lines. A Source Tree 210 may include one or more nodes, with each node representing a unique source (S) from the mcache. The root of a Source Tree may be referred to as a Source Tree global root. For example, in FIG. 2, the node representing source S2 is a local root for the portion of the Source Tree 210 depicted in FIG. 2. The nodes in a Source Tree may be organized according to an AVL tree based upon the source address values. A node in a Source Tree can point to up to two child source nodes. In one embodiment, a Source Tree node (e.g., S2) has two pointers (or references or branches) with a left pointer that can point to another node (e.g., S1) in the Source Tree representing a source address that is less than the address represented by the source node (e.g., S2), and a right pointer that can point to another node (e.g., S3) in the Source Tree representing a source address that is greater than the address represented by the source node (e.g., S2).

In addition to the left and right pointers, a node representing a particular source in the Source Tree also points to a root of a tree of nodes representing mcache entries with that same particular source. The tree of nodes representing mcache entries with that same particular source may be referred to as a Source (S, G) Tree. Each node of a Source (S, G) Tree represents a mcache entry. For example, in FIG. 2, the root node of Source Tree 210 representing source S2 points to the root node S2G2 of the Source (S, G) Tree 220 comprising (S, G) nodes representing mcache entries S2G1, S2G2, and S2G3. Each Source (S, G) Tree 220 may be an AVL tree with nodes organized based upon the addresses of the respective group (G).

Figure 3:
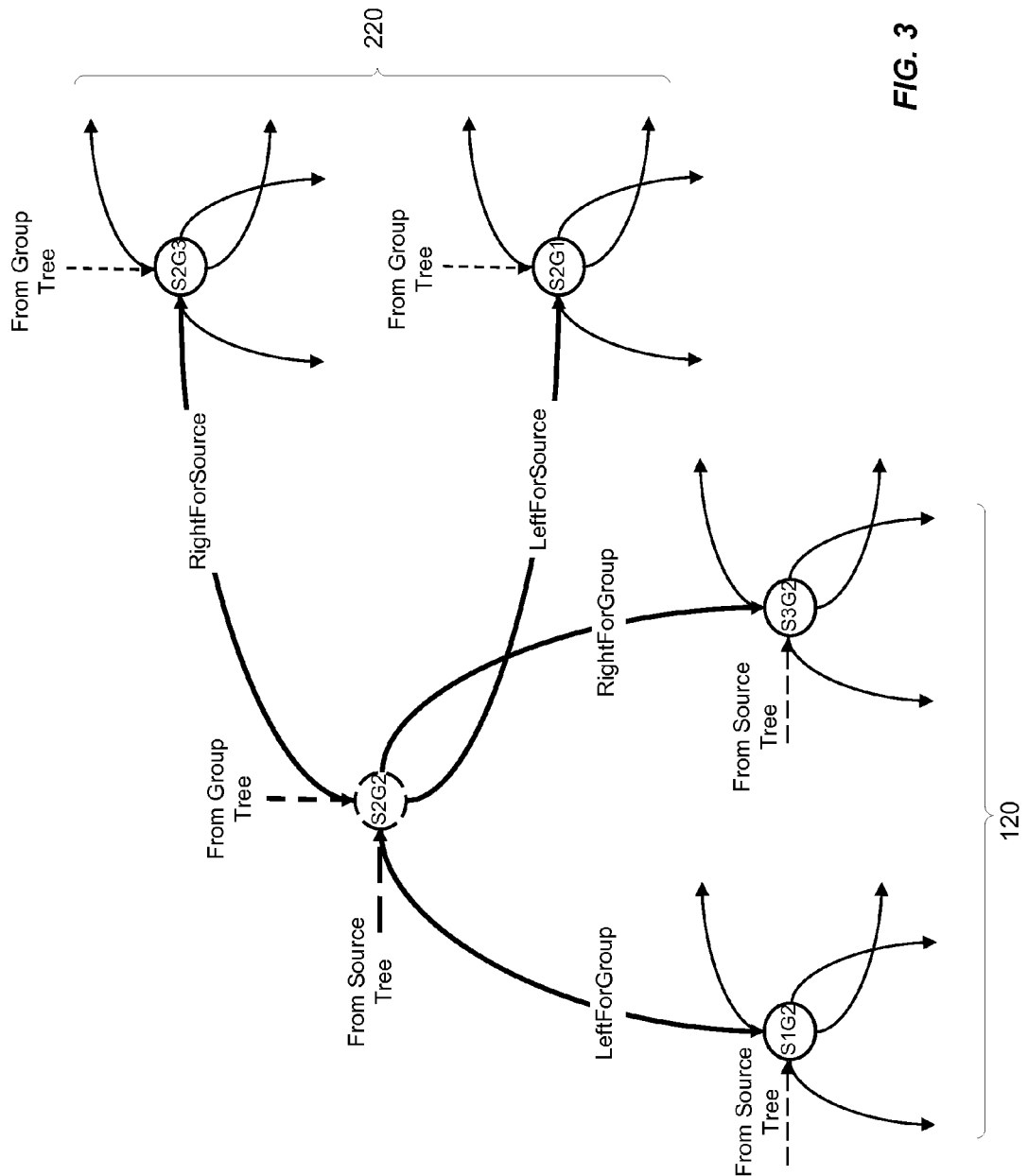
FIG. 3 depicts an example of a mcache entry node being part of two AVL trees according to an embodiment of the present invention.

In one embodiment, each mcache node is part of two AVL trees. FIG. 3 depicts an example of a mcache entry node (e.g., S2G2) being part of two AVL trees according to an embodiment of the present invention. The Group (S, G) Tree 120 is based on the group address, and the root node of this Group (S, G) Tree 120 is pointed to by the group node for that group. The Source (S, G) Tree 220 is based on the source address, and the root node of this (S, G) Tree 220 is pointed to by the source node for that source. For example, S2G2, which is assumed to be the root node of both the Source (S, G) Tree 220 for the source S2 and the Group (S, G) Tree 120 for the group G2 in this example, is pointed to by Source Tree node S2 and Group Tree node G2, neither of which is shown in FIG. 3. Each non-root node of a Group (S, G) Tree is only pointed to by its parent (S, G) node in the same Group (S, G) Tree and not from (S, G) nodes in other Group (S, G) Trees. Similarly, each non-root node of a Source (S, G) Tree is only pointed to by its parent (S, G) node in the same Source (S, G) Tree and not from (S, G) nodes in other Source (S, G) Trees.

As described above, mcache entries are represented by nodes in the Group (S, G) Trees and Source (S, G) Trees. A node representing a mcache entry is thus a part of two trees, namely, a Group (S, G) Tree and a Source (S, G) Tree. This overlap between the Group (S, G) Tree 120 and Source (S, G) Tree 220 is depicted in FIG. 3. Such an organization of mcache entries information enables various operations to be performed efficiently. For example, given an mcache entry (S, G), the data structures can be used to efficiently determine another mcache entry with the same group G and a different source S (i.e., with next higher or next lower source address), or another mcache entry with the same source S and a different group G (i.e., with next higher or next lower group address). For example, given a mcache entry S2G2, the data structures depicted in FIG. 3 can be used to determine the mcache entry with the next lower source address and same group address (i.e., S1G2) by traveling the left pointer of the node representing S2G2 in the Group (S, G) Tree 120 ("Left For Group"), and the mcache entry with the next higher source address and same group address (i.e., S3G2) can be reached by traveling the right pointer of the node representing S2G2 in the Group (S, G) Tree 120 ("Right For Group"). Similarly, from mcache entry node S2G2, the mcache entry with the next lower group address and same source address (i.e., S2G1) can be reached by traveling the left pointer of the node representing S2G2 in the Source (S, G) Tree 220 ("Left For Source"), and the mcache entry with the next higher group address and same source address (i.e., S2G3) can be reached by traveling the right pointer of the node representing S2G2 in the Source (S, G) Tree 220 ("Right For Source").

Storing data structures representing each mcache entry node, or (S, G) node, as being part of the Source Tree and Group Tree divides the whole mcache information along a source (S) dimension and a group (G) dimension and enables efficient querying of the mcache information based upon these dimensions or a combination thereof. The mcache entries are divided into various subsets by their source addresses and their group addresses. This allows traversal of the mcache entries by their group addresses or by their source addresses.

Figure 4:
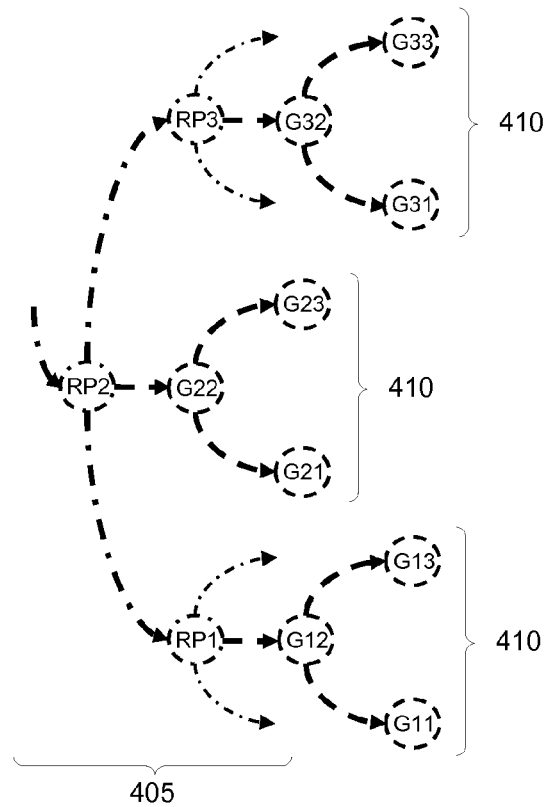
FIG. 4 depicts an example of an AVL tree of RPs hashed to by groups in the mcache, by their address, according to an embodiment of the present invention.

In one embodiment, data structures are provided for organizing information related to RPs that are hashed to by each group in the mcache, by their address. FIG. 4 depicts an example of data structures for organizing multicast groups and RPs according to an embodiment of the present invention. In the embodiment depicted in FIG. 4, the data structures are AVL trees, although other data structures may be used in alternative embodiments.

FIG. 4 depicts two types of AVL trees, namely an RP Tree 405 depicted using dash dot lines and multiple RP Group Trees 410 depicted using short dash lines. An RP Tree 405 may include one or more nodes, with each node representing a unique RP from the mcache. The root of an RP Tree may be referred to as an RP Tree global root. For example, in FIG. 4, the node representing RP2 is a local root for the portion of the RP Tree 405 depicted in FIG. 4. The nodes in an RP Tree may be organized according to an AVL tree based upon the RP address values. A node in a RP Tree can point to up to two child RP nodes. In one embodiment, an RP Tree node (e.g., RP2) has two pointers (or references or branches) with a left pointer that can point to another node (e.g., RP1) in the RP Tree representing an RP address that is less than the address represented by the RP node (e.g., RP2), and a right pointer that can point to another node (e.g., RP3) in the RP Tree representing an RP address that is greater than the address represented by the RP node (e.g., RP2).

In addition to the left and right pointers, a node representing a particular RP in the RP Tree also points to a root of a tree of nodes representing all the groups that hash to the particular RP. The tree of nodes representing all the groups that hash to the particular RP may be referred to as a RP Group Tree. Each node of an RP Group Tree represents a group. For example, in FIG. 4, the root node of RP Tree 405 representing RP2 points to the root node G22 of the RP Group Tree 410 comprising group nodes representing groups G22, G21, and G23. Each RP Group Tree 410 may be an AVL tree with nodes organized based upon the addresses of the comprised groups.

Figure 5:
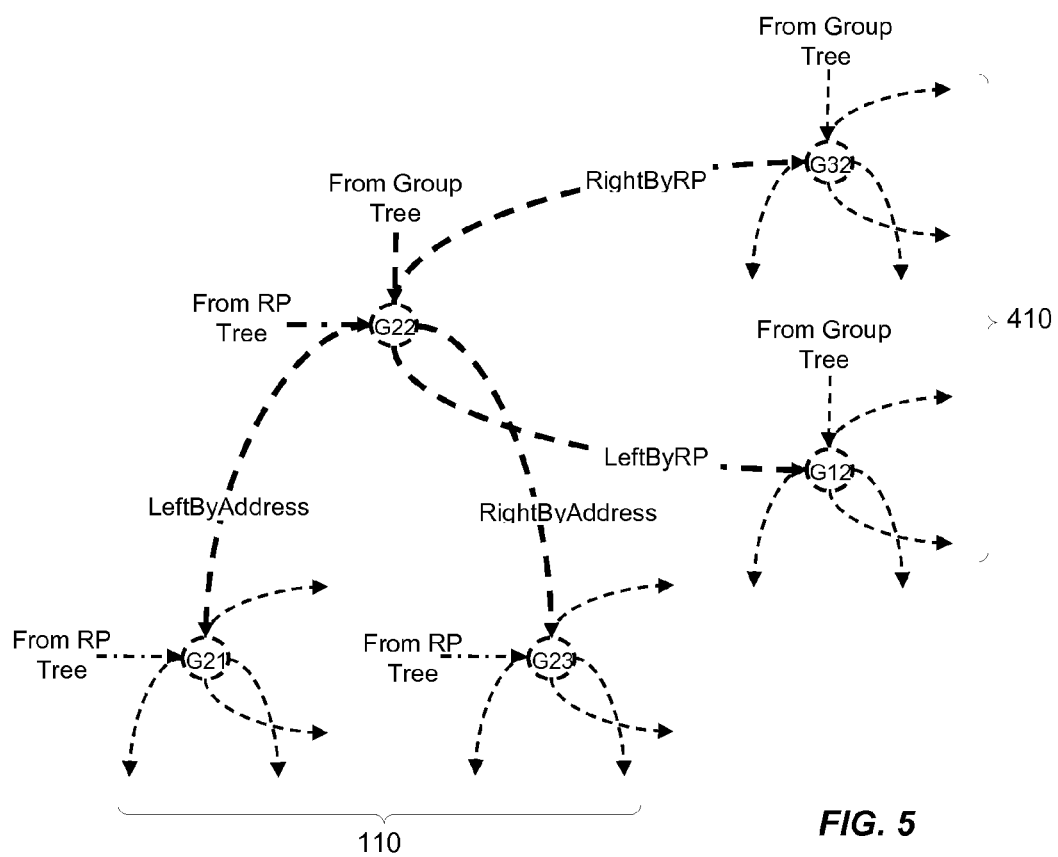
FIG. 5 depicts an example of a group node being part of two AVL trees according to an embodiment of the present invention.

In one embodiment, each group node is part of two AVL trees. FIG. 5 depicts an example of a group node (e.g., G22) being part of two AVL trees according to an embodiment of the present invention. The Group Tree 110 includes all groups in the mcache, is based on the group address, and is rooted globally. The RP Group Tree 410 includes groups that hash to the same RP, and the root node of this RP Group Tree is pointed to by the RP node. Representing each group node as being part of the Group Tree and an RP Group Tree allows traversal of the groups by their group addresses or by the RPs to which they hash.

As described above, groups are represented by nodes in the Group Trees and RP Group Trees. A node representing a group is thus a part of two trees, namely, the Group Tree and an RP Group Tree. This overlap between the Group Tree 110 and RP Group Tree 410 is depicted in FIG. 5. Such an organization of group information enables various operations to be performed efficiently. For example, given a group G, the data structures can be used to efficiently determine another group with the next higher or next lower group address, or another group with the next higher or next lower group address that also hashes to the same RP. For example, given a group G22, the data structures depicted in FIG. 5 can be used to determine the group with the next lower group address (i.e., G21) by traveling the left pointer of the node representing G22 in the Group Tree 110 ("Left By Address"), and the group with the next higher group address (i.e., G23) by traveling the right pointer of the node representing G22 in the Group Tree 110 ("Right By Address"). From group node G22, the group with the next lower group address (i.e., G12) that hashes to the same RP to which G22 hashes can be reached by traveling the left pointer of the node representing G22 in the RP Group Tree 410 ("Left By RP"), and the group with the next higher group address (i.e., G32) that hashes to the same RP to which G22 hashes can be reached by traveling the right pointer of the node representing G22 in the RP Group Tree 410 ("Right By RP").

In one embodiment, data structures are provided for organizing information related to RPF neighbors toward each source in the mcache, by their address. FIG. 6 depicts data structures for organizing multicast sources and RPF neighbors according to an embodiment of the present invention. In the embodiment depicted in FIG. 4, the data structures are AVL trees, although other data structures may be used in alternative embodiments.

FIG. 6 depicts two types of AVL trees, namely a Neighbor Tree 605 depicted using long dash dot dot lines and multiple Neighbor Source Trees 610 depicted using long dash lines. A Neighbor Tree 605 may include one or more nodes, with each node representing a unique RPF neighbor from the mcache. The root of a Neighbor Tree may be referred to as a Neighbor Tree global root. For example, in FIG. 6, the node representing N2 is a local root for the portion of the Neighbor Tree 605 depicted in FIG. 6. The nodes in a Neighbor Tree may be organized according to an AVL tree based upon the RPF neighbor address values. A node in a Neighbor Tree can point to up to two child RPF neighbor nodes. In one embodiment, a Neighbor Tree node (e.g., N2) has two pointers (or references or branches) with a left pointer that can point to another node (e.g., N1) in the Neighbor Tree representing an RPF neighbor address that is less than the address represented by the RPF neighbor node (e.g., N2), and a right pointer that can point to another node (e.g., N3) in the Neighbor Tree representing an RPF neighbor address that is greater than the address represented by the RPF neighbor node (e.g., N2).

In addition to the left and right pointers, a node representing a particular RPF neighbor in the Neighbor Tree also points to a root of a tree of nodes representing all the sources that use this particular neighbor as its RPF neighbor. The tree of nodes representing all the sources that use this particular neighbor as its RPF neighbor may be referred to as a Neighbor Source Tree. Each node of a Neighbor Source Tree represents a source. For example, in FIG. 6, the root node of Neighbor Tree 605 representing N2 points to the root node S22 of the Neighbor Source Tree 610 comprising source nodes representing sources S22, S21, and S23. Each Neighbor Source Tree 610 may be an AVL tree with nodes organized based upon the addresses of the comprised sources.

In one embodiment, each source node is part of two AVL trees. FIG. 7 depicts an example of a source node (e.g., S22) being part of two AVL trees according to an embodiment of the present invention. The Source Tree 210 includes all sources in the mcache, is based on the source address, and is rooted globally. The Neighbor Source Tree 610 includes sources that have the same RPF neighbor, and the root node of this Neighbor Source Tree 610 is pointed to by the neighbor node. Representing each source node as being part of the Source Tree and a Neighbor Source Tree allows traversal of the sources by their source addresses or by their RPF neighbors.

As described above, sources are represented by nodes in the Source Trees and Neighbor Source Trees. A node representing a source is thus a part of two trees, namely, the Source Tree and a Neighbor Source Tree. This overlap between the Source Tree 210 and Neighbor Source Tree 610 is depicted in FIG. 7. Such an organization of source information enables various operations to be performed efficiently. For example, given a source S, the data structures can be used to efficiently determine another source with the next higher or next lower source address, or another source with the next higher or next lower source address that also uses the same RPF neighbor. For example, given a source S22, the data structures depicted in FIG. 7 can be used to determine the source with the next lower source address (i.e., S21) by traveling the left pointer of the node representing S22 in the Source Tree 210 ("Left By Address"), and the source with the next higher source address (i.e., S23) by traveling the right pointer of the node representing S22 in the Source Tree 210 ("Right By Address"). From source node S22, the source with the next lower source address (i.e., S12) that routes through the same RPF neighbor through which S22 routes can be reached by traveling the left pointer of the node representing S22 in the Neighbor Source Tree 610 ("Left By Nbr"), and the source with the next higher source address (i.e., S32) that routes through the same RPF neighbor through which S22 routes can be reached by traveling the right pointer of the node representing S22 in the Neighbor Source Tree 610 ("Right By Nbr").

In one embodiment, an RP node is a node of one AVL tree. FIG. 8 depicts an example of RP nodes being part of one AVL tree. The RP Tree 405 is based on the RP addresses and is rooted globally.

In one embodiment, a RPF neighbor node is a node of one AVL tree. FIG. 9 depicts an example of RPF neighbor nodes being part of one AVL tree. The Neighbor Tree 605 is based on the RPF neighbor addresses and is rooted globally.

Figure 10:
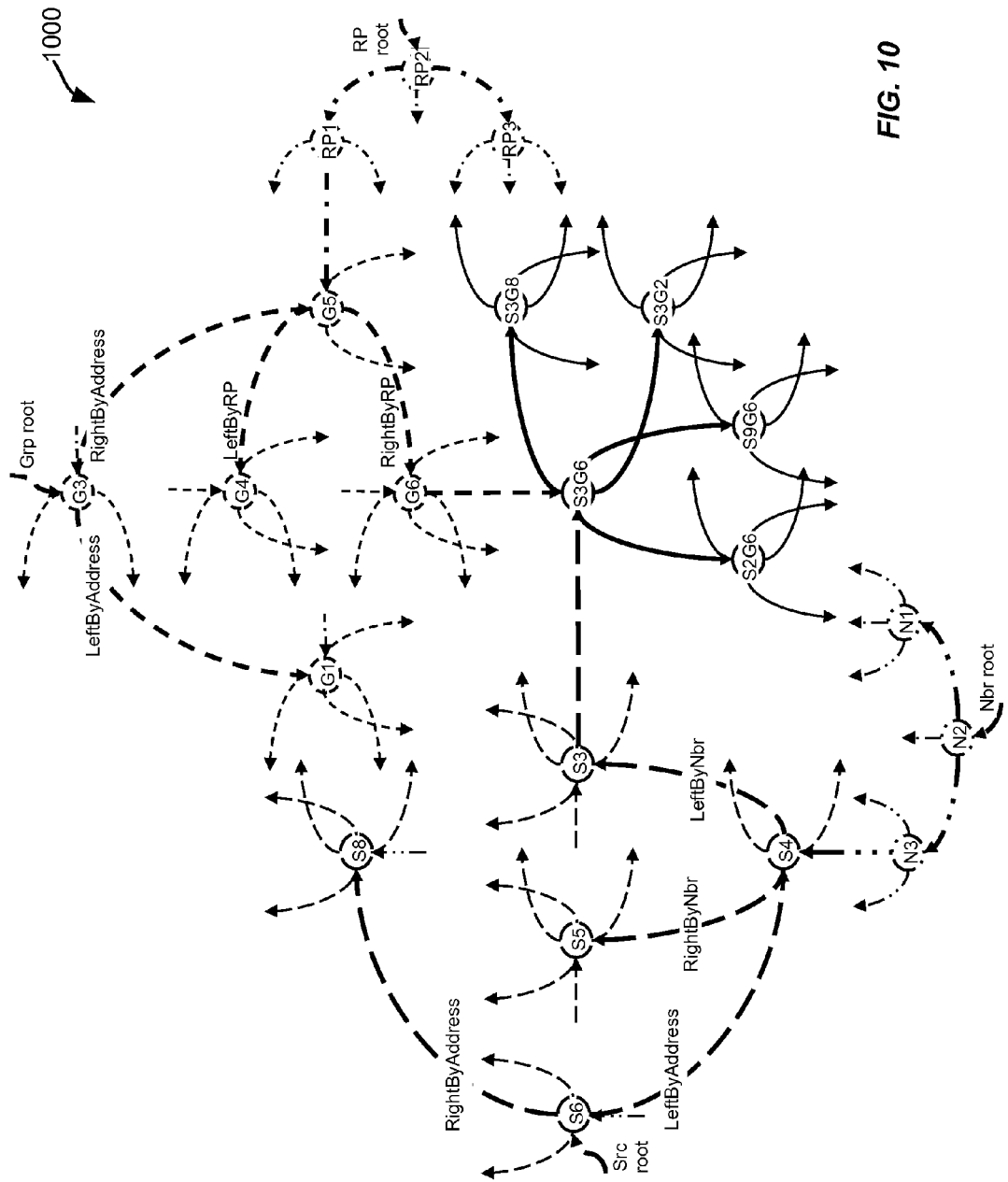
FIG. 10 depicts an example of a comprehensive view of the mcache according to an embodiment of the present invention.

In one embodiment, the mcache is divided according to multiple dimensions or views, for example, two or more of the following: source, group, RP, and RPF neighbor. FIG. 10 depicts an example of a comprehensive view 1000 of the mcache, including all the trees mentioned above (i.e., Source Tree, Group Tree, Source (S, G) Tree, Group (S, G) Tree, RP Tree, Neighbor Tree, RP Group Tree, and Neighbor Source Tree). The example of the comprehensive view 1000 of the mcache illustrates the various trees for the mcache entry S3G6. Mcache entry S3G6 is pointed to by Group Tree node G6, which is pointed to by group node G5 of an RP Group Tree, the comprised groups of which hash to RP1 of the RP Tree. Mcache entry S3G6 is also pointed to by Source Tree node S3, which is pointed to by source node S4 of a Neighbor Source Tree, the comprised sources of which use N3 of the Neighbor Tree as their RPF neighbor.

Appendix A provides example data structures for memory cache used for multicast routing in accordance with some embodiments of the present invention. Example data structures are included for implementations of mcache entry node, group node, source node, RP node, and RPF neighbor node. Specific embodiments described in Appendix A are not limiting examples of the invention.

Designs, techniques, and example data structures for implementing multi-dimensional tree structures are provided for organizing multicast information and mcache entries according to multiple dimensions. Details of how these designs and techniques enable efficient, heursitic searches and traversals needed to support PIM protocol operations on the stored data are provided below. Also described are several procedures for traversing the mcache, which may be needed or triggered by the various protocol and CLI events.

Appendix B provides example APIs for memory cache used for multicast routing that may be implemented in accordance with an embodiment of the present invention. Example APIs are included for creating, deleting, and looking up mcache entries; various ways of traversing the mcache; and updating RP for a group or RPF neighbor for a source. Specific embodiments described in Appendix B are not limiting examples of the invention.

One example of a heuristic search enabled by the described designs is a search, or look up for a particular mcache (S, G) entry. According to PIM protocol, a network device (e.g., a router) receives from each of its downstream neighbors at least every 60 seconds, a Join/Prune message, which includes a list of groups and a list of joined and pruned sources for each group. Given a Join/Prune message, the network device needs to search for the particular mcache (S, G) entries identified by the listed groups and sources. A particular mcache (S, G) entry may be found using two binary searches, one on the Group Tree and the other on the Group (S, G) Tree. For example, the Group Tree may be searched first, and then the Group (S, G) Tree may be searched.
1) Use the Group Tree global root to do a binary search on the Group Tree to find the group node.
2) Use the pointer of the group node to get to the root of the Group (S, G) Tree for this group.
3) Use this root to do a binary search on the Group (S, G) Tree to find the (S, G) node.

Alternatively, the Source Tree may be searched first, and then the Source (S, G) Tree may be searched.
1) Use the Source Tree global root to do a binary search on the Source Tree to find the source node.
2) Use the pointer of the source node to get to the root of the Source (S, G) Tree for this source.
3) Use this root to do a binary search on the Source (S, G) Tree to find the (S, G) node.

Thus, a particular mcache (S, G) entry can be found using only two binary searches, with a complexity of O(log n), where n is the number of nodes in the tree prior to the operation. The binary searches heuristically identify the particular (S, G) node without having to do an exhaustive search, unlike with conventional multicast routing techniques.

The multi-dimensional tree structure designs also enable traversal of all mcache entries in numerical order, which may be used for displaying the mcache in response to a command such as "Show ip pim mcache" from the CLI. This is in contrast to conventional multicast routing techniques, in which mcache entries are essentially traversed in random order and cannot be sorted into numerical order, due to their structure through hash tables and linked lists. With the multi-dimensional tree structure designs, mcache entries may be traversed in numerical order by using one of four procedures.

The first procedure traverses the mcache entries first by group, and then by source. The mcache entries are traversed in ascending order of groups, according to ascending order of the sources within each group.
1) Use the Group Tree global root to traverse the Group Tree in order to get the groups in ascending order.
2) For each group, use the pointer of the node to get to the root of the Group (S, G) Tree for this group.
3) Use this root to traverse the Group (S, G) Tree in order to get all the (S, G) entries under this group in ascending order.

The second procedure traverses the mcache entries first by source, and then by group. The mcache entries are traversed in ascending order of sources, according to ascending order of the groups for each source.
1) Use the Source Tree global root to traverse the Source Tree in order to get the sources in ascending order.
2) For each source, use the pointer of the node to get to the root of the Source (S, G) Tree for this source.
3) Use this root to traverse the Source (S, G) Tree in order to get all the (S, G) entries under this source in ascending order.

The third procedure traverses the mcache entries first by RP, then by group, and finally by source. The mcache entries are traversed in ascending order of RPs, according to ascending order of the groups that hash to each RP, according to ascending order of the sources within each group.
1) Use the RP Tree global root to traverse the RP Tree in order to get the RPs in ascending order.
2) For each RP, use the pointer of the node to get to the root of the RP Group Tree for this RP.
3) Use this root to traverse the RP Group Tree in order to get all the groups that hash to this RP in ascending order.
4) For each group, use the pointer of the node to get to the root of the Group (S, G) Tree for this group.
5) Use this root to traverse the Group (S, G) Tree in order to get all the (S, G) entries under this group in ascending order.

The fourth procedure traverses the mcache entries first by RPF neighbor, then by source, and finally by group. The mcache entries are traversed in ascending order of RPF neighbors, according to ascending order of the sources that use each RPF neighbor, according to ascending order of the groups for each source.
1) Use the Neighbor Tree global root to traverse the Neighbor Tree in order to get the neighbors in ascending order.
2) For each neighbor, use the pointer of the node to get to the root of the Neighbor Source Tree for this neighbor.
3) Use this root to traverse the Neighbor Source Tree in order to get all the sources whose routes go through this neighbor in ascending order.
4) For each source, use the pointer of the node to get to the root of the Source (S, G) Tree for this source.
5) Use this root to traverse the Source (S, G) Tree in order to get all the (S, G) entries under this source in ascending order.

Another PIM protocol operation that benefits from the multi-dimensional tree structure designs is the processing when an RP goes down. Because PIM mcache information is conventionally structured with hash tables and linked lists, when using conventional multicast routing techniques and an RP goes down, all of the mcache entries need to be traversed to determine which particular mcache entries are affected by the event. However, with the described multi-dimensional tree structure designs, only the groups in the mcache that hash to the affected RP are traversed.
1) Use the RP Tree global root to do a binary search on the RP Tree and find the RP that went down (e.g., RP1 of FIG. 10).
2) Follow the pointer of the node to get to the root of all groups that used to hash to the affected RP (e.g., G5 for affected RP1 of FIG. 10).
3) Traverse the RP Group Tree from this root to visit all groups that used to hash to the affected RP.
4) For each node, Gi, in the RP Group Tree from the root, remove the node Gi from the RP Group Tree of the affected RP and add node Gi to the RP Group Tree of the new RP, RPj.
5) Handle PIM operations (e.g., sending Join/Prune messages triggered by the RP down event) on Gi and all (S, G) entries under Gi.
6) Remove the node of the affected RP from the RP Tree.

As mentioned above, processing when an RP goes down using conventional multicast routing techniques results in all of the mcache entries being traversed. However, with the above procedure, the groups that are affected by the RP down event are reached directly, without needing to traverse any groups that are not affected by the event. Once a group that has been affected is identified, the Group (S, G) Tree containing all (S, G) entries for this group can be reached directly, without needing to traverse any (S, G) entries that are not affected by the event. All the (S, G) entries affected by the event (i.e., the (S, G) entries that were using the affected RP) are implicitly migrated to new RP(s), without these (S, G) entries needing to be moved individually.

Similarly, the processing when an RP goes up also improves in efficiency as a benefit from the multi-dimensional tree structure designs. As with the RP down event, an RP up event also requires traversal of all mcache entries when using conventional multicast routing techniques.
1) Use the RP Tree global root to insert a node for the new RP, RPj, into the RP Tree.

2) Use the Group Tree global root to traverse the Group Tree in order to get the groups in ascending order.
3) For each node, Gi, in the Group Tree, apply the RP hash with the new RP set that includes the newly up RP, RPj.
4) If Gi now hashes to RPj, remove the node Gi from the RP Group Tree of the old RP and add node Gi to the RP Group Tree of the new RP, RPj.
5) If Gi has been moved, handle PIM operations (e.g., sending Join/Prune messages triggered by the RP up event) on Gi and all (S, G) entries under Gi.

Even though all the groups in the mcache are traversed in this event, all (S, G) entries that are affected can be reached, without needing to traverse any (S, G) entries that are not affected by the event. This offers significant savings over conventional designs, which would require traversal of all mcache entries. All the (S, G) entries affected by the event (i.e., the (S, G) entries that now hash to the new RP) are implicitly migrated to the new RP, without these (S, G) entries needing to be moved individually.

Another PIM protocol operation that benefits from the multi-dimensional tree structure designs is the processing when an RPF neighbor goes down. For this event, all entries in the mcache that have the same Reverse Path Forwarding (RPF) neighbor are traversed. As with the RP down event and the RP up event, an RPF neighbor down event also requires traversal of all mcache entries when using conventional multicast routing techniques.

1) Use the Neighbor Tree global root to do a binary search on the Neighbor Tree and find the neighbor that went down (e.g., N3 of FIG. 10).
2) Follow the pointer of the node to get to the root of all sources whose routes used to go through the affected neighbor (e.g., S4 for affected N3 of FIG. 10).
3) Traverse the Neighbor Source Tree from this root to visit all sources whose routes used to go through the affected neighbor.
4) For each node, Si, in the Source Tree from the root, remove the node Si from the Neighbor Source Tree of the affected neighbor and add node Si to the Neighbor Source Tree of the new neighbor, Nj.
5) Handle PIM operations (e.g., sending Join/Prune messages triggered by the RPF neighbor down event) on Si and all (S, G) entries under Si.
6) Remove the node of the affected neighbor from the Neighbor Tree.

As mentioned above, processing when an RPF neighbor goes down using conventional multicast routing techniques results in all of the mcache entries being traversed. However, with the above procedure, the sources that are affected by the RPF neighbor down event are reached directly, without needing to traverse any sources that are not affected by the event. Once a source that has been affected is identified, the Source (S, G) Tree containing all (S, G) entries for this source can be reached directly, without needing to traverse any (S, G) entries that are not affected by the event. All the (S, G) entries affected by the event (i.e., the (S, G) entries whose routes used to go through the affected RPF neighbor) are implicitly migrated to new RPF neighbor(s), without these (S, G) entries needing to be moved individually.

Similarly, the processing when an RPF neighbor goes up also improves in efficiency as a benefit from the multi-dimensional tree structure designs. As with the RPF neighbor down event, an RPF neighbor up event also requires traversal of all mcache entries when using conventional multicast routing techniques.

1) Use the Neighbor Tree global root to insert a node for the new neighbor, Nj, into the Neighbor Tree.

2) Use the Source Tree global root to traverse the Source Tree in order to get the sources in ascending order.
3) For each node, Si, in the Source Tree, perform a route lookup to determine if the route for Si now goes through the new neighbor, Nj.
4) If Si's route now goes through Nj, remove the node Si from Neighbor Source Tree of the old neighbor and add node Si to the Neighbor Source Tree of the new neighbor, Nj.
5) If Si has been moved, handle PIM operations (e.g., sending Join/Prune messages triggered by the RPF neighbor up event) on Si and all (S, G) entries under Si.

Even though all the sources in the mcache are traversed in this event, all (S, G) entries that are affected can be reached, without needing to traverse any (S, G) entries that are not affected by the event. This offers significant savings over conventional designs, which would require traversal of all mcache entries. All the (S, G) entries affected by the event (i.e., the (S, G) entries that now route through the new neighbor) are implicitly migrated to the new neighbor, without these (S, G) entries needing to be moved individually.

Another PIM protocol operation that benefits from the multi-dimensional tree structure designs is the processing of PIM Join/Prune messages. For this event, entries in the mcache are traversed to search for the (S, G) entries listed in the Join/Prune message. With conventional multicast routing techniques, processing of a Join/Prune message requires an exhaustive search for the listed (S, G) entries in the worst case, if the distribution of source and group addresses are such that they all map to the same hash bucket.

1) Use the Group Tree global root to do a binary search on the Group Tree to find the group node for each Gi in the incoming message.
2) Follow the pointer from node Gi to get to the root of the Group (S, G) Tree containing all (S, G) entries for this group, Gi.
3) Use this (S, Gi) tree root to do a binary search on the Group (S, G) Tree to find the (Sj, Gi) node for each Sj of group Gi in the incoming message.
4) Handle the PIM operations (e.g., adding or removing outgoing interfaces (OIFs), resetting timers, etc.) on this (Sj, Gi) entry.

Since the format of the PIM Join/Prune message lists the entries as a list of random (i.e., in no particular order) groups, with a list of random (i.e., no particular order) sources within each group, this procedure provides efficient lookup for processing Join/Prune messages.

Outgoing PIM Join/Prune messages are also efficiently assembled using procedures based on the multi-dimensional tree structure designs. For this event, all distinct groups in the mcache are traversed, and all sources in the mcache of a given group are traversed.

1) Use the Group Tree global root to traverse the Group Tree in order.
2) Assemble the group Gi into the outgoing message.
3) Follow the pointer from node Gi to get to the root of the Group (S, G) Tree containing all (S, G) entries for this group, Gi.
4) Use this (S, Gi) tree root to traverse the Group (S, G) Tree and assemble the (Sj, Gi) node into the outgoing message for the RPF neighbor of source Sj.

Since the format of the PIM Join/Prune message lists the entries as a list of random (i.e., in no particular order) groups, with a list of random (i.e., no particular order) sources within each group, this procedure provides efficient assembling for outgoing Join/Prune messages.

Similar to the processing of RPF neighbor up or down events, processing of Route Table Manager (RTM) route changes also benefits from the multi-dimensional tree structure designs discussed above. A network device (e.g., a router) can receive notice of an RTM route change through a Route Program Message (RPM) or the unicast route table. For this event, all entries in the mcache with the same source are traversed.

1) Use the Source Tree global root to do a binary search on the Source Tree and find the source node(s), Si, towards which the route has changed. In the case of route prefix changes, the lowest Si with an address within the prefix range can be looked up, and then the source nodes can be traversed in ascending order from that node Si until all the nodes of sources with addresses within the prefix range have been found. Alternatively, the entire Source Tree may be traversed to find all the sources with addresses within the prefix range.
2) For each node Si in the Source Tree, perform a route lookup to determine if the route for Si now goes through a different RPF neighbor.
3) If Si's route now goes through a different RPF neighbor, remove the node Si from the Neighbor Source Tree of the old neighbor and add node Si to the Neighbor Source Tree of the new neighbor.
4) If Si has been moved, handle PIM operations (e.g., sending Join/Prune messages triggered by the RPF neighbor change event) on Si and all (S, G) entries under Si.

As an example, a router may receive notice through the RPM or the unicast route table of an RTM route change for prefixes starting at 10.0.0.0 but less than 11.0.0.0. In this case, all sources within the mcache with addresses starting with 10 (i.e., within the prefix range) can be found, and a route lookup can be performed to determine if that source now routes through a different RPF neighbor. If the route for the source has changed, the node for the source will be moved from the old neighbor to the new neighbor, and PIM operations will be handled for that source and all mcache entries with that source.

By performing a heuristic binary search rather than an exhaustive search on the Source Tree, a smaller number of sources are likely traversed before identifying all sources that may have been affected by the event. For example, with a given prefix range, the Source Tree is searched in order of ascending addresses until all the sources with addresses within the prefix range have been traversed. Unaffected sources with addresses greater than the prefix range would not be traversed with this procedure, whereas at least some of these unaffected sources with addresses greater than the prefix range could be, and likely would be, traversed in an exhaustive search performed with conventional multicast routing techniques. In addition, with the above procedure, all (S, G) entries that are affected can be reached, without needing to traverse any (S, G) entries that are not affected by the event. This offers significant savings over conventional designs. All the (S, G) entries affected by the event (i.e., the (S, G) entries that now route through a new neighbor) are implicitly migrated to the new neighbor, without these (S, G) entries needing to be moved individually.

Figure 11:
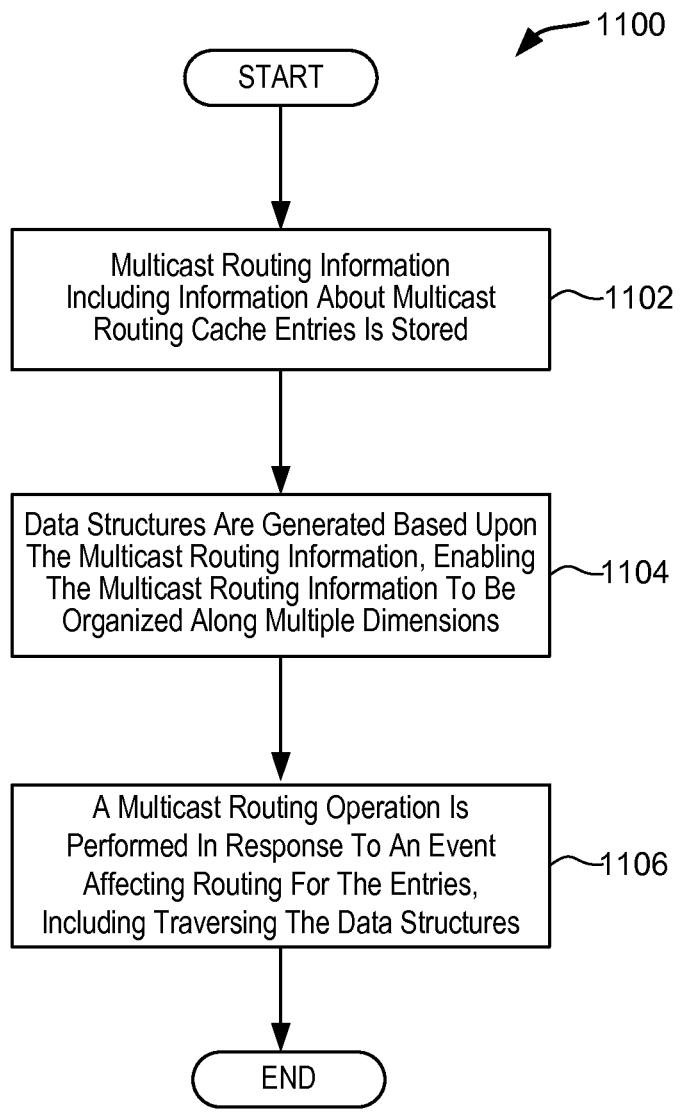
FIG. 11 depicts a simplified flowchart depicting processing performed for grouping multicast routing information into data structures and performing a multicast routing operation using the data structures according to an embodiment of the present invention.

FIG. 11 depicts a simplified flowchart 1100 depicting processing performed for grouping multicast routing information into data structures and performing a multicast routing operation using the data structures according to an embodiment of the present invention. The processing depicted in FIG. 1100 may be implemented in software (e.g., code, instructions, program) executed by one or more processors, hardware, or combinations thereof. In some embodiments, the software may be stored on a non-transitory computer-readable storage medium. The particular series of processing steps depicted in FIG. 11 is not intended to limit the scope of embodiments of the present invention. In one embodiment, the processing depicted in FIG. 11 may be performed by a multicast router.

At 1102, a memory of a network device stores multicast routing information including information about multicast routing cache entries (i.e., mcache entries). In one embodiment, the multicast routing information includes addresses of sources, multicast groups, RPs, and RPF neighbors for the multicast routing cache entries.

At 1104, a processor of the network device generates a set of data structures based upon the multicast routing information. The data structures enable the multicast routing information to be organized and queried along multiple dimensions or parameters. This organization provides multiple ways to view or relate the entries within the multicast routing cache. For example, as discussed above, the multicast routing information may be organized along, but are not limited to one or more of the multicast source, the multicast group, the RP, and the RPF neighbor.

In one embodiment, one or more data structures represent a node of a tree structure based upon the multicast routing information. For example, the data structures can be used in the manner discussed above and structured as depicted in any of FIGS. 1-10 or as provided in Appendix A. In one embodiment, a data structure represents one of a multicast routing cache entry, a multicast source, a multicast group, a RP, and a RPF neighbor.

At 1106, the processor performs a multicast routing operation in response to an event affecting routing for one or more multicast routing cache entries. The processor performs the multicast routing operation by traversing one or more data structures in the set of data structures to identify the one or more multicast routing cache entries affected by the event without checking any multicast routing cache entries not affected by the event. The one or more multicast routing cache entries affected by the event are identifiable by traversing the one or more data structures according to at least two dimensions of the multiple dimensions.

In one embodiment, the multicast routing operation can be processing a multicast route change, processing a RP up event, processing a RP down event, processing a RPF neighbor up event, processing a RPF neighbor down event, and sending a Join/Prune message. Each of these multicast routing operations directly or indirectly affects (e.g., searches for, creates, updates, or deletes) one or more multicast routing cache entries. In other embodiments, the multicast routing operation can be searching for one or more multicast routing cache entries, traversing all multicast routing cache entries, or processing a Join/Prune message.

Performing the multicast routing operation can include traversing the data structures according to ascending order of addresses of one or more of the multicast source, the multicast group, the RP, and the RPF neighbor. In addition or alternatively, performing the multicast routing operation can include traversing the data structures to perform a heuristic binary search for one or more of a multicast routing cache entry, a multicast source, a multicast group, a RP, and a RPF neighbor.

For example, as described above, if the multicast routing operation performed is processing an RP down event, the particular affected RP may be searched using the RP Tree, and all affected groups may be identified by traversing the RP Group Tree of the affected RP. All affected (S, G) entries may then be identified by traversing the Group (S, G) Trees of the affected groups. That is, the affected mcache (S, G) entries are identified by traversing the data structures along an RP dimension and a group dimension. For an RP up event, the affected mcache (S, G) entries are also identified along the RP dimension and the group dimension. Similarly, for RPF up or down events, the affected mcache (S, G) entries are identified along a RPF neighbor dimension and a source dimension. In contrast to conventional multicast routing techniques, the above procedures do not result in any unaffected (S, G) entries being traversed or checked for an effect (e.g., a changed parameter) from the event. This leads to faster and more efficient performance of the multicast routing operations.

Figure 12:
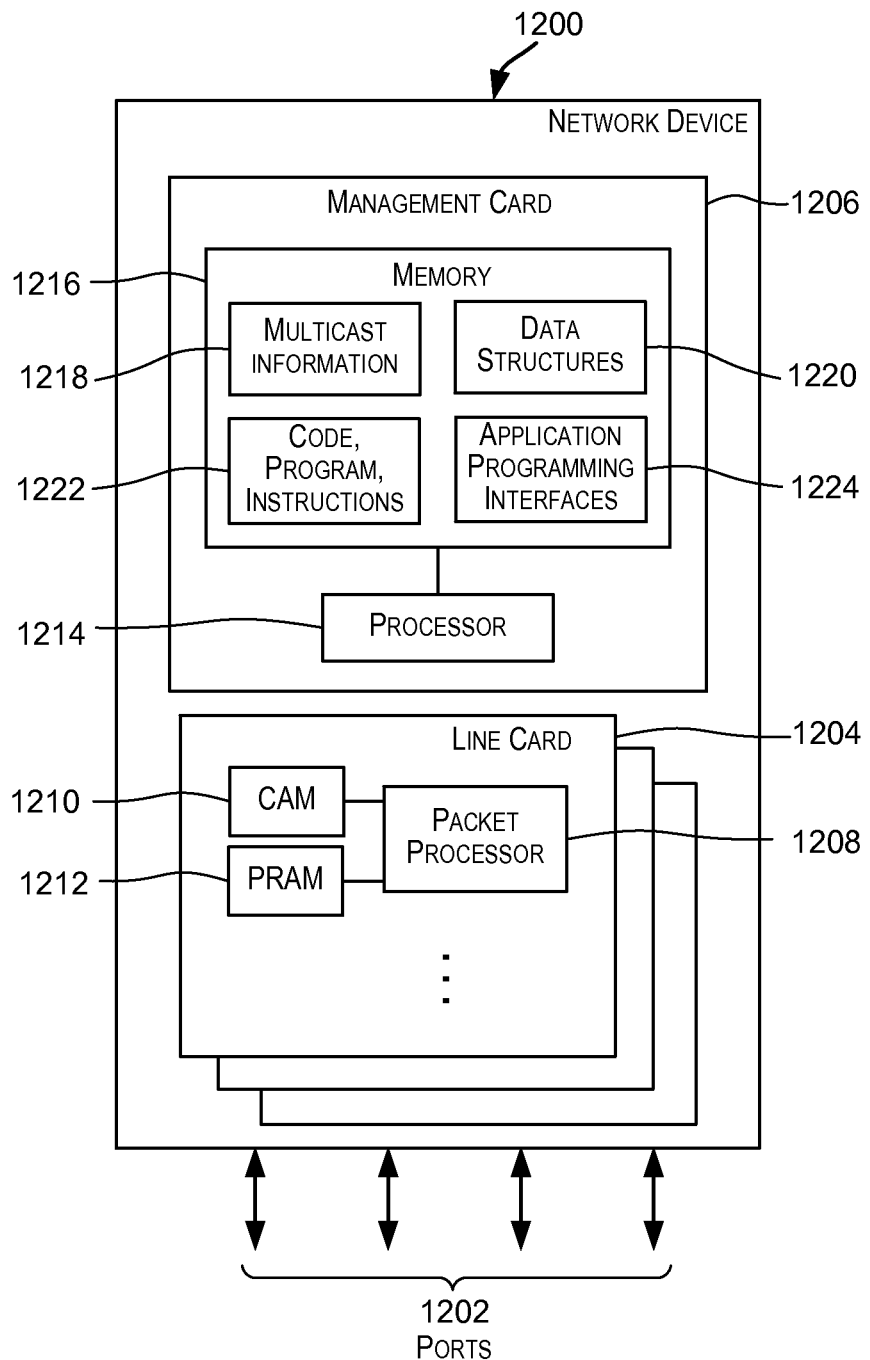
FIG. 12 depicts a simplified block diagram of a network device that may be configured to store and use multicast information, data structures, and application programming interfaces according to an embodiment of the present invention.

FIG. 12 depicts a simplified block diagram of a network device 1200 that may be configured to store and use multicast information, data structures, and APIs according to an embodiment of the present invention. Network device 1200 may be a router or switch that is configured to forward data such as a router or switch provided by Brocade Communications Systems, Inc. For example, the network device 1200 may be a multicast router adapted to or configured to execute a multicast routing protocol and provide multicast routing services. The multicast routing services include services and functions related to facilitating routing of multicast data.

The multicast protocols supported may include the PIM protocol, which is a collection of multicast routing protocols including protocols such as PIM Sparse-Mode, PIM dense Mode, Bi-directional PIM, and others. For example, in one embodiment, network device 1200 may execute the PIM protocol to facilitate multicast routing. The protocols used in a network connected to network device 1200 may include wired and/or wireless protocols. While embodiments have been described using the PIM protocol, other multicast protocols are also included within the scope of embodiments of the present invention.

A multicast router is adapted to or configured to receive packets, including unicast and multicast packets, and forward the packets in such a way that it facilitates delivery of the packets to their intended one or multiple destinations. For a multicast packet, network device 1200 may be adapted to or configured to replicate the packet depending upon the number of recipients of the packet and forward the replicates to facilitate delivery of the packets to members of the multicast group corresponding to the packet's multicast destination address.

In the embodiment depicted in FIG. 12, network device 1200 comprises a plurality of ports 1202 for receiving and forwarding data packets and multiple cards that are configured to perform processing to facilitate forwarding of the data packets. The multiple cards may include one or more line cards 1204 and one or more management cards 1206. A card, sometimes also referred to as a blade or module, can be inserted into one of a plurality of slots on the chassis of network device 1200. This modular design allows for flexible configurations with different combinations of cards in the various slots of the device according to differing network topologies and switching requirements. The components of network device 1200 depicted in FIG. 12 are meant for illustrative purposes only and are not intended to limit the scope of the invention in any manner. Alternative embodiments may have more or less components than those shown in FIG. 12.

In the embodiment depicted in FIG. 12, network device 1200 comprises a plurality of ports 1202 for receiving and forwarding data, including unicast and multicast packets, using ports 1202. Ports 1202 represent the I/O plane for network device 1200. A port within ports 1202 may be classified as an input port or an output port depending upon whether network device 1200 receives or transmits a data packet using the port. A port over which a data packet is received by network device 1200 is referred to as an input port. A port used for communicating or forwarding a data packet from network device 1200 is referred to as an output port. A particular port may function both as an input port and an output port. A port may be connected by a link or interface to a neighboring network device or network. Ports 1202 may be capable of receiving and/or transmitting different types of data traffic including multicast data traffic at different speeds including 1 Gigabit/sec, 10 Gigabits/sec, 40 Gigabits/sec, or more. In some embodiments, multiple ports of network device 1200 may be logically grouped into one or more trunks.

Upon receiving a data packet via an input port, network device 1200 is configured to determine an output port for the packet for transmitting the data packet from the network device to another neighboring network device or network. Within network device 1200, the packet is forwarded from the input network device to the determined output port and transmitted from network device 1200 using the output port. In one embodiment, forwarding of packets from an input port to an output port is performed by one or more line cards 1204.

Line cards 1204 represent the data forwarding plane of network device 1200. Each line card 1204 may comprise one or more packet processors 1208 that are programmed to perform forwarding of data packets from an input port to an output port. A packet processor on a line card may also be referred to as a line processor. Each packet processor 1208 may have associated memories to facilitate the packet forwarding process. In one embodiment, as depicted in FIG. 12, each packet processor 1208 may have an associated content addressable memory (CAM) 1210 and a RAM 1212 for storing forwarding parameters (RAM 1212 may accordingly also be referred to as a parameter RAM or PRAM). In one embodiment, for a packet received via an input port, the packet is provided to a packet processor 1208 of a line card 1204 coupled to the input port. The packet processor receiving the packet is configured to determine an output port of network device 1200 to which the packet is to be forwarded based upon information extracted from the packet. The extracted information may include, for example, the header of the received packet. In one embodiment, a packet processor 1208 is configured to perform a lookup in its associated CAM 1210 using the extracted information. A matching CAM entry then provides a pointer to a location in the associated PRAM 1212 that stores information identifying how the packet is to be forwarded within network device 1200. Packet processor 1208 then facilitates forwarding of the packet from the input port to the determined output port.

Since processing performed by a packet processor 1208 needs to be performed at a high packet rate in a deterministic manner, packet processor 1208 is generally a dedicated hardware device configured to perform the processing. In one embodiment, packet processor 1208 is a programmable logic device such as a field programmable gate array (FPGA). Packet processor 1208 may also be an ASIC.

Management card 1206 is configured to perform management and control functions for network device 1200 and thus represents the management plane for network device 1200. In one embodiment, management card 1206 is communicatively coupled to line cards 1204 and includes software and hardware for controlling various operations performed by the line cards. In one embodiment, a single management card 1206 may be used for all the line cards 1204 in network device 1200. In alternative embodiments, more than one management cards may be used, with each management card controlling one or more line cards.

A management card 1206 may comprise a processor 1214 (also referred to as a management processor) that is configured to perform functions performed by management card 1206 and associated memory 1216. As depicted in FIG. 12, multicast information 1218 may be stored in memory 1216. The multicast information 1218 may be stored and used in a manner as described above. Data structures 1220 and APIs 1224 may be stored in memory 1216. Data structures 1220 may include one or more of the data structures described above, such as the data structures depicted in FIGS. 1-10, or the data structures provided in Appendix A. APIs 1224 may include one or more of the APIs described above or the APIs provided in Appendix B. Memory 1216 is also configured or adapted to store various programs/code/instructions 1222 and data constructs that are used for processing performed by processor 1214 of management card 1206. For example, programs/code/instructions, which when executed by processor 1214 cause the data structures and APIs to be accessed and cause the multicast information to be stored and used in an efficient manner in performing the above-described multicast-routing related operations, may be stored in memory 1216. In one embodiment, processor 1214 is a general purpose microprocessor such as a PowerPC, Intel, AMD, or ARM microprocessor, operating under the control of software 1222 stored in associated memory 1216.

Appendix A

Data Structures for Memory Cache Used for Multicast Routing

Entry Node

```
#define MCACHE_ENTRY_MAGIC_INUSE 0xBADCODE1
#define MCACHE_ENTRY_MAGIC_FREED 0xBADCODE2
typedef struct MCACHE_ENTRY_NODE
{
    M_AVLL_NODE   by_src;
    M_AVLL_NODE   by_grp;
    DVMRP_FWD_ENTRY fwd_entry;
    UINT32              magic_number;
} MCACHE_ENTRY_NODE;
```

Group Node

```
#define MCACHE_GRP_MAGIC_INUSE 0xBADCODE3
#define MCACHE_GRP_MAGIC_FREED 0xBADCODE4
typedef struct MCACHE_GRP_NODE
{
    M_AVLL_NODE   by_addr;
    M_AVLL_NODE   by_rp;
    M_AVLL_TREE   s_root;
    MADDR_ST      grp_addr;
    UINT32        magic_number;
} MCACHE_GRP_NODE;
```

Source Node

```
#define MCACHE_SRC_MAGIC_INUSE 0xBADCODE5
#define MCACHE_SRC_MAGIC_FREED 0xBADCODE6
typedef struct MCACHE_SRC_NODE
{
    M_AVLL_NODE   by_addr;
    M_AVLL_NODE   by_nbr;
    M_AVLL_TREE   g_root;
    MADDR_ST      src_addr;
    UINT32        magic_number;
} MCACHE_SRC_NODE;
```

RP Node

```
#define MCACHE_RP_MAGIC_INUSE 0xBADCODE7
#define MCACHE_RP_MAGIC_FREED 0xBADCODE8
typedef struct MCACHE_RP_NODE
{
    M_AVLL_NODE   by_addr;
    M_AVLL_TREE   g_root;
    MADDR_ST      rp_addr;
    UINT32        magic_number;
} MCACHE_RP_NODE;
```

Neighbor Node

```
#define MCACHE_NBR_MAGIC_INUSE 0xBADCODE9
#define MCACHE_NBR_MAGIC_FREED 0xBADCODEA
typedef struct MCACHE_NBR_NODE
{
    M_AVLL_NODE   by_addr;
    M_AVLL_TREE   s_root;
    MADDR_ST      nbr_addr;
    UINT32        magic_number;
} MCACHE_NBR_NODE;
```

Mcache Traversal Ticket

This may be used to help the mcache library preserve state between traversal calls, to support incremental traversals.
typedef UINT32 MCACHE_TRVL_TICKET;

The mcache library may cast this value internally into pointers to structures that hold information about the current state of the traversal.

Result Codes

```
typedef enum
{
    mCacheLibResultFailure = -1,
    mCacheLibResultSuccess = 0,
    mCacheLibResultOutOfMem = 1,
} mCacheLibResultCode;
```

Updates to PIM CLASS

The following elements may be added to the PIM_CLASS structure:
M_AVLL_TREE rp_root;
M_AVLL_TREE grp_root;
M_AVLL_TREE src_root;
M_AVLL_TREE nbr_root;

Appendix B

APIs for Memory Cache Used for Multicast Routing

Creating New Mcache Entry
DVMRP_FWD_ENTRY *mcache_create_entry(VRF_INDEX vrf, MADDR_ST *s, MADDR_ST *g);
Updating RP for a Group
void mcache_update_rp_for_group(VRF_INDEX vrf, MADDR_ST *g, MADDR_ST *rp);
Updating RPF Neighbor for a Source
void mcache_update_nbr_for_source(VRF_INDEX vrf, MADDR_ST *s, MADDR_ST *nbr);
Looking Up an Mcache Entry
DVMRP_FWD_ENTRY *mcache_lookup_fwd_entry(VRF_INDEX vrf, MADDR_ST *s, MADDR_ST *g);
Deleting an Entry from Mcache
void mcache_delete_entry(VRF_INDEX vrf, DVMRP_FWD_ENTRY *fwd_entry);

Traversing the Mcache

1. Traversing the Entire Mcache

```
DVMRP_FWD_ENTRY *mcache_get_first_entry(VRF_INDEX vrf, MCACHE_TRVL_TICKET *tkt);
DVMRP_FWD_ENTRY *mcache_get_next_entry(DVMRP_FWD_ENTRY *fwd_entry, MCACHE_TRVL_TICKET *tkt);
```

This API may be called repeatedly until the API returns NULL. All the entries in the mcache will be returned one-by-one, sorted in ascending order of group addresses, sorted in ascending order of source addresses within each group.

2. Traversing all Groups in the mcache

```
DVMRP_FWD_ENTRY *mcache_get_first_group(VRF_INDEX vrf, MCACHE_TRVL_TICKET *tkt);
DVMRP_FWD_ENTRY *mcache_get_next_group(DVMRP_FWD_ENTRY *fwd_entry, MCACHE_TRVL_TICKET *tkt);
```

This API may be called repeatedly until the API returns NULL. All distinct groups will be returned one-by-one, sorted in ascending order of group addresses. The entry with lowest source address will be returned for each group.

3. Traversing all Groups for the Same RP

```
DVMRP_FWD_ENTRY *mcache_get_first_group_for_RP(VRF_INDEX vrf, MCACHE_TRVL_TICKET *tkt);
DVMRP_FWD_ENTRY *mcache_get_next_group_for_RP(DVMRP_FWD_ENTRY *fwd_entry, MCACHE_TRVL_TICKET *tkt);
```

This API may be called repeatedly until the API returns NULL. All the groups for the same RP will be returned one-by-one, sorted in ascending order of group addresses. The entry with lowest source address will be returned for each group.

4. Traversing all Entries for the Same Group

```
DVMRP_FWD_ENTRY *mcache_get_first_entry_for_group(VRF_INDEX vrf, MADDR_ST *g, MCACHE_TRVL_TICKET *tkt);
DVMRP_FWD_ENTRY *mcache_get_next_entry_for_group(DVMRP_FWD_ENTRY *fwd_entry, MCACHE_TRVL_TICKET *tkt);
```

This API may be called repeatedly until the API returns NULL. All the entries for the same group will be returned one-by-one, sorted in ascending order of source addresses.

5. Traversing all Entries for the Same Source

```
DVMRP_FWD_ENTRY *mcache_get_first_entry_for_source(VRF_INDEX vrf, MADDR_ST *s, MCACHE_TRVL_TICKET *tkt);
DVMRP_FWD_ENTRY *mcache_get_next_entry_for_source(DVMRP_FWD_ENTRY *fwd_entry, MCACHE_TRVL_TICKET *tkt);
```

This API may be called repeatedly until the API returns NULL. All the entries for the same source will be returned one-by-one, sorted in ascending order of group addresses.

6. Traversing all Entries for the Same RPF Neighbor

```
DVMRP_FWD_ENTRY *mcache_get_first_entry_for_neighbor(VRF_INDEX vrf, MADDR_ST *s, MCACHE_TRVL_TICKET *tkt);
DVMRP_FWD_ENTRY *mcache_get_next_entry_for_neighbor(DVMRP_FWD_ENTRY *fwd_entry, MCACHE_TRVL_TICKET *tkt);
```

This API may be called repeatedly until the API returns NULL. All the entries for the same RPF neighbor will be returned one-by-one, sorted in ascending order of group and source addresses.

7. Traversing all Sources in the mcache

```
MADDR_ST *mcache_get_first_source(VRF_INDEX vrf, MCACHE_TRVL_TICKET *tkt);
MADDR_ST *mcache_get_next_source(MADDR_ST *src, MCACHE_TRVL_TICKET *tkt);
```

8. Traversing all RPs in the mcache

```
MADDR_ST *mcache_get_first_rp(VRF_INDEX vrf, MCACHE_TRVL_TICKET *tkt);
MADDR_ST *mcache_get_next_rp(MADDR_ST *src, MCACHE_TRVL_TICKET *tkt);
```

Various embodiments described above can be realized using any combination of dedicated components and/or programmable processors and/or other programmable devices. The various embodiments may be implemented only in hardware, or only in software, or using combinations thereof. The various processes described herein can be implemented on the same processor or different processors in any combination, with each processor having one or more cores. Accordingly, where components or modules are described as being adapted to or configured to perform a certain operation, such configuration can be accomplished, e.g., by designing electronic circuits to perform the operation, by programming programmable electronic circuits (such as microprocessors) to perform the operation, by providing software or code instructions that are executable by the component or module (e.g., one or more processors) to perform the operation, or any combination thereof. Processes can communicate using a variety of techniques including but not limited to conventional techniques for interprocess communication, and different pairs of process may use different techniques, or the same pair of processes may use different techniques at different times. Further, while the embodiments described above may make reference to specific hardware and software components, those skilled in the are will appreciate that different combinations of hardware and/or software components may also be used and that particular operations described as being implemented in hardware might also be implemented in software or vise versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims.

What is claimed is:

1. A network device comprising:
   a memory adapted to:
      store multicast routing information including information about multicast routing cache entries;
   a processor communicatively coupled to the memory, the processor adapted to:
      generate a set of data structures based upon the multicast routing information; and
      perform a multicast routing operation relating to one or more multicast routing cache entries, the performing comprising traversing one or more data structures in the set of data structures,
   wherein the set of data structures includes at least a first data structure that is organized by a first dimension of a plurality of dimensions and a second data structure that is organized by a second dimension that differs from the first dimension in the plurality of dimensions; and
   wherein the traversing comprises:
      selecting a particular data structure from the set of data structures; and traversing the particular data structure to locate one or more elements of the one or more multicast routing cache entries that satisfy specified criteria.

2. The network device of claim 1 wherein one or more data structures in the set of data structures represent a node of a tree structure based upon the multicast routing information.

3. The network device of claim 1 wherein a data structure in the set of data structures represents one of the following: a multicast routing cache entry, a multicast source, a multicast group, a rendezvous point, and a reverse path forwarding neighbor.

4. The network device of claim 1 wherein the plurality of dimensions include one or more of the following: multicast source, multicast group, rendezvous point, and reverse path forwarding neighbor.

5. The network device of claim 1 wherein the multicast routing operation is one of the following: searching for one or more multicast routing cache entries, traversing all multicast routing cache entries, processing a multicast route change, processing a rendezvous point up event, processing a rendezvous point down event, processing a reverse path forwarding neighbor up event, processing a reverse path forwarding neighbor down event, sending a Join/Prune message, and processing a Join/Prune message.

6. The network device of claim 1 wherein the performing comprises traversing the data structures according to ascending order of addresses of one of the following: multicast source, multicast group, rendezvous point, and reverse path forwarding neighbor.

7. The network device of claim 1 wherein the performing comprises traversing the data structures to perform a heuristic binary search for one or more of the following: a multicast routing cache entry, a multicast source, a multicast group, a rendezvous point, and a reverse path forwarding neighbor.

8. A method comprising:
storing multicast routing information including information about multicast routing cache entries;
generating a set of data structures based upon the multicast routing information; and
performing a multicast routing operation in response to an event affecting routing for one or more multicast routing cache entries, the performing comprising traversing one or more data structures in the set of data structures to identify the one or more multicast routing cache entries affected by the event,
wherein the set of data structures includes at least a first data structure that is organized by a first dimension of a plurality of dimensions and a second data structure that is organized by a second dimension that differs from the first dimension in the plurality of dimensions; and
wherein the traversing comprises:
selecting a particular data structure from the set of data structures; and
traversing the particular data structure to locate one or more elements of the one or more multicast routing cache entries that satisfy specified criteria.

9. The method of claim 8 wherein one or more data structures in the set of data structures represent a node of a tree structure based upon the multicast routing information.

10. The method of claim 8 wherein a data structure in the set of data structures represents one of the following: a multicast routing cache entry, a multicast source, a multicast group, a rendezvous point, and a reverse path forwarding neighbor.

11. The method of claim 8 wherein the plurality of dimensions include one or more of the following: multicast source, multicast group, rendezvous point, and reverse path forwarding neighbor.

12. The method of claim 8 wherein the multicast routing operation is one of the following: processing a multicast route change, processing a rendezvous point up event, processing a rendezvous point down event, processing a reverse path forwarding neighbor up event, processing a reverse path forwarding neighbor down event, and sending a Join/Prune message.

13. The method of claim 8 wherein the performing comprises traversing the data structures according to ascending order of addresses of one or more of the following: multicast source, multicast group, rendezvous point, and reverse path forwarding neighbor.

14. The method of claim 8 wherein the performing comprises traversing the data structures to perform a heuristic binary search for one or more of the following: a multicast routing cache entry, a multicast source, a multicast group, a rendezvous point, and a reverse path forwarding neighbor.

15. A computer-readable memory storing a plurality of instructions for controlling a router device, the plurality of instructions comprising:
instructions that cause a memory in the router device to store multicast routing information including information about multicast routing cache entries;
instructions that cause a processor in the router device to:
generate a set of data structures based upon the multicast routing information; and
perform a multicast routing operation relating to one or more multicast routing cache entries, the performing comprising traversing one or more data structures in the set of data structures,
wherein the set of data structures includes at least a first data structure that is organized by a first dimension of a plurality of dimensions and a second data structure that is organized by a second dimension that differs from the first dimension in the plurality of dimensions; and
wherein the traversing comprises:
selecting a particular data structure from the set of data structures; and
traversing the particular data structure to locate one or more elements of the one or more multicast routing cache entries that satisfy specified criteria.

16. The memory of claim 15 wherein one or more data structures in the set of data structures represent a node of a tree structure based upon the multicast routing information.

17. The memory of claim 15 wherein a data structure in the set of data structures represents one of the following: a multicast routing cache entry, a multicast source, a multicast group, a rendezvous point, and a reverse path forwarding neighbor.

18. The memory of claim 15 wherein the plurality of dimensions include one or more of the following: multicast source, multicast group, rendezvous point, and reverse path forwarding neighbor.

19. The memory of claim 15 wherein the multicast routing operation is one of the following: searching for one or more multicast routing cache entries, traversing all multicast routing cache entries, processing a multicast route change, processing a rendezvous point up event, processing a rendezvous point down event, processing a reverse path forwarding neighbor up event, processing a reverse path forwarding neighbor down event, sending a Join/Prune message, and processing a Join/Prune message.

20. The memory of claim 15 wherein the instructions that cause the processor to perform the multicast routing operation comprise instructions that cause the processor to traverse the data structures according to ascending order of addresses of one of the following: multicast source, multicast group, rendezvous point, and reverse path forwarding neighbor.

21. The memory of claim 15 wherein the instructions that cause the processor to perform the multicast routing operation comprise instructions that cause the processor to traverse the data structures to perform a heuristic binary search for one or more of the following: a multicast routing cache entry, a multicast source, a multicast group, a rendezvous point, and a reverse path forwarding neighbor.

22. The memory of claim 15, wherein: selecting the particular data structure from the set of data structure comprises selecting a particular tree from a set of trees that includes at least a source tree that is organized primarily by a source dimension and a group tree that is organized primarily by a group dimension.

* * * * *

UNITED STATES PATENT AND TRADEMARK OFFICE
CERTIFICATE OF CORRECTION

PATENT NO. : 9,143,335 B2
APPLICATION NO. : 13/621138
DATED : September 22, 2015
INVENTOR(S) : Ajeer Salil Pudiyapura Page 1 of 1

It is certified that error appears in the above-identified patent and that said Letters Patent is hereby corrected as shown below:

On Title Page 3

Item (56) References Cited, Other Publications:

Replace "Chen, "New Paradigm In Application Delivery Networking: Advanced Core Operating System (ACOS) and Multi-CPU Architecture- They Key to Achieving Availability, Scalability and Preformance." White Paper, May 2009, 5 pages, A10 Networks." with -- Chen, "New Paradigm In Application Delivery Networking: Advanced Core Operating System (ACOS) and Multi-CPU Architecture- The Key to Achieving Availability, Scalability and Performance." White Paper, May 2009, 5 pages, A10 Networks. --

Signed and Sealed this
Fifteenth Day of March, 2016

Michelle K. Lee
*Director of the United States Patent and Trademark Office*